United States Patent
Marson et al.

(10) Patent No.: US 12,362,948 B2
(45) Date of Patent: Jul. 15, 2025

(54) AUTHENTICATION USING AN EPHEMERAL ASYMMETRIC KEYPAIR

(71) Applicant: Cryptography Research, Inc., San Jose, CA (US)

(72) Inventors: Mark Evan Marson, Carlsbad, CA (US); Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 317 days.

(21) Appl. No.: 17/915,367

(22) PCT Filed: Mar. 26, 2021

(86) PCT No.: PCT/US2021/024329
§ 371 (c)(1),
(2) Date: Sep. 28, 2022

(87) PCT Pub. No.: WO2021/206933
PCT Pub. Date: Oct. 14, 2021

(65) Prior Publication Data
US 2023/0155845 A1    May 18, 2023

Related U.S. Application Data

(60) Provisional application No. 63/006,295, filed on Apr. 7, 2020.

(51) Int. Cl.
*H04L 9/32*  (2006.01)
*H04L 9/08*  (2006.01)
*H04L 9/30*  (2006.01)

(52) U.S. Cl.
CPC .......... *H04L 9/3271* (2013.01); *H04L 9/0825* (2013.01); *H04L 9/3073* (2013.01); *H04L 9/3218* (2013.01)

(58) Field of Classification Search
CPC ... H04L 9/3271; H04L 9/0825; H04L 9/3073; H04L 9/3218; H04L 9/3247; H04L 2209/84; H04L 9/3263
(Continued)

(56) References Cited

U.S. PATENT DOCUMENTS 8,190,895 B2     5/2012  Lauter et al.
2010/0217986 A1*  8/2010  Schneider ............. H04L 9/3242
                                                         380/279
(Continued)

FOREIGN PATENT DOCUMENTS

WO   WO-2024182468 A1 *  9/2024

OTHER PUBLICATIONS

Notification of Transmittal of the International Search Report and the Written Opinion of the International Searching Authority, or the Declaration with Mail Date Jun. 9, 2021 re: Int'l Appln. No. PCT/US2021/024329. 10 pages.

*Primary Examiner* — Kambiz Zand
*Assistant Examiner* — Aubrey H Wyszynski
(74) *Attorney, Agent, or Firm* — The Neudeck Law Firm, LLC

(57) ABSTRACT

A prover chip uses a key multiplier value generated by a proof-of-work function from a challenge value, a random number, and elliptic curve cryptography (ECC) techniques to generate a one-time (or ephemeral) use private key. Similarly, a verifier chip uses the key multiplier value generated by an equivalent proof-of-work function, a public key received from the prover, and ECC techniques to derive a one-time use public key that corresponds to the ephemeral private key generated by the prover chip. The prover chip uses the ephemeral private key to sign the second challenge value and send this signed second challenge value to the verifier chip. The verifier verifies the value it receives using (Continued)

the one-time use public key and if the signature on the second challenge value is valid, authenticates the prover chip to a system.

20 Claims, 17 Drawing Sheets

(58) Field of Classification Search
USPC .......................................................... 713/189
See application file for complete search history.

(56) References Cited

U.S. PATENT DOCUMENTS

| | | | |
|---|---|---|---|
| 2014/0281554 A1* | 9/2014 | Maletsky | H04L 9/3268 |
| | | | 713/175 |
| 2018/0241557 A1* | 8/2018 | Maes | H03M 13/19 |
| 2019/0238347 A1* | 8/2019 | Martineau | H04L 9/0827 |
| 2019/0280863 A1* | 9/2019 | Meyer | H04L 9/50 |
| 2020/0272446 A1* | 8/2020 | Koo | G06F 8/61 |
| 2021/0044965 A1* | 2/2021 | Nambisan | H04W 12/63 |

* cited by examiner

AUTHENTICATION USING AN EPHEMERAL ASYMMETRIC KEYPAIR

DETAILED DESCRIPTION OF THE EMBODIMENTS

Figure 1A:
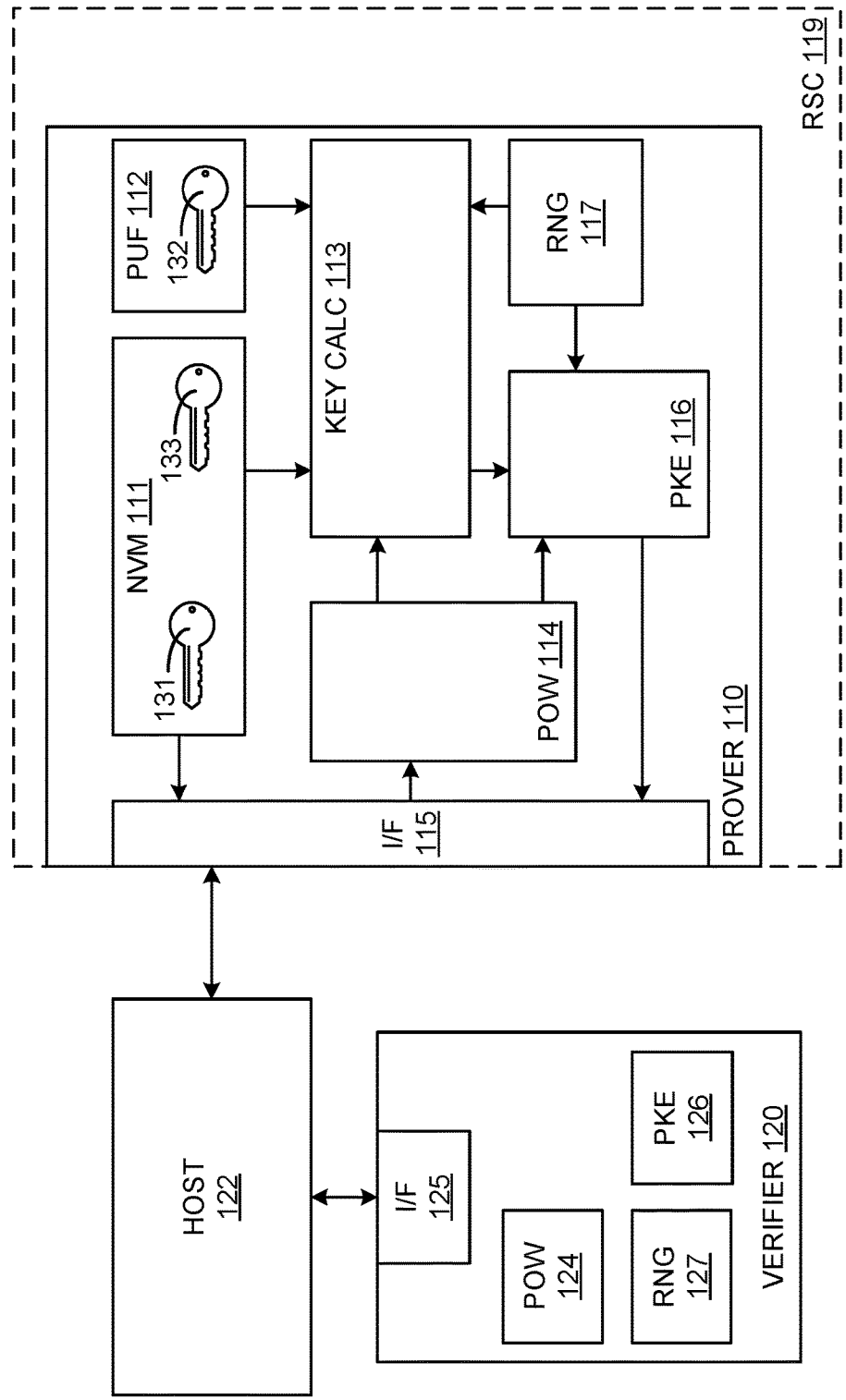
FIGS. 1A-1F are block diagrams illustrating authentication of an at-risk system component.

Anti-counterfeiting systems may use asymmetric key authentication to determine the authenticity of an at-risk system component (e.g., printer cartridge, rechargeable battery, automotive subsystems, etc.) For example, to prove it is authentic, a "prover chip" (i.e., an integrated circuit in chip form) in the at-risk system component may provide a signed public key certificate to a "verifier chip" (i.e., also an integrated circuit in chip form). The verifier integrated circuit then uses a challenge-response protocol and the public key to determine whether the prover integrated circuit knows the secret key and is thereby authentic.

In an embodiment, a prover chip sends the verifier chip a signed public key certificate. The verifier chip generates and sends the prover chip a first challenge value that is based at least in part on a random number that is (most likely) different for each challenge. The prover chip processes the first challenge value through a proof-of-work circuit to derive a key multiplier value and a second challenge value. The verifier chip also processes the first challenge value through an equivalent proof-of-work function to derive the key multiplier value and the second challenge value.

The prover chip uses the key multiplier value, another random number, and elliptic curve cryptography (ECC) techniques to generate a one-time (or ephemeral) use private key. Similarly, the verifier chip uses the key multiplier value, the public key contained in the certificate received from the prover, and ECC techniques to derive a one-time use public key that corresponds to the ephemeral private key generated by the prover chip. The prover chip uses the ephemeral private key to encrypt or sign the second challenge value and sends this value to the verifier chip. (Note that the distinction between encrypting and signing distinction is well understood, and challenge-response authentication may rely on either or both approaches. Specifically, in the case of "encrypting", the second challenge value itself is encrypted. In contrast, in the "signing" case, a digest or cryptographic hash of the second challenge value is encrypted.) The verifier decrypts the value it receives using the one-time (or ephemeral) use public key. In the case where the prover chip performed an "encrypting" operation, if the decrypted value matches the second challenge value, the verifier chip authenticates the prover chip to a system. In the case where the prover chip performed a "signing" operation, if the decrypted value matches a digest (e.g., a cryptographic hash) of the second challenge value, the verifier chip authenticates the prover chip to the system. Since at least a portion of the first challenge value is based on a verifier chip generated random number, the masking value, the resulting ephemeral private key, and the second challenge value being encrypted/signed are different for each challenge-response transaction—thereby greatly complicating side channel analysis (SCA) attacks such as differential power analysis (DPA).

FIGS. 1A-1F are block diagrams illustrating authentication of a replaceable system component. In FIGS. 1A-1F, system 100 includes verifier integrated circuit 120, host 122, and at-risk system component (RSC) 119. RSC 119 is considered "at risk" because it is a common target for would-be cloners and counterfeiters (e.g., printer cartridges, automotive subsystems, medical consumables, electronic batteries, e-cigarette cartridges, etc.) RSC 119 includes prover integrated circuit 110. Prover integrated circuit 110 includes nonvolatile memory (NVM) 111, an optional physically unclonable function (PUF) 112, key calculation circuitry 113, proof-of-work circuitry (POW) 114, interface 115, public key computational circuitry (a.k.a., a public key "engine"—PKE) 116, and random number generator circuitry (RNG) 117. It should be understood that PUF circuitry 112 may not be included in some embodiments. Verifier integrated circuit 120 includes proof-of-work circuitry (POW) 124, interface 125, public key computational circuitry (PKE) 126, and random number generator circuitry (RNG) 127.

In FIGS. 1A-1F, prover integrated circuit 110 is operatively coupled to host 122 via interface 115. Host 122 is operatively coupled to verifier integrated circuit 120 via interface 125. Thus, prover integrated circuit 110 and verifier integrated circuit 120 may communicate information via host 122. Note that in some embodiments, host 122 and verifier integrated circuit 120 may be different chips and interface 125 is a chip-to-chip interface. In in other embodiments, verifier integrated circuit 120 is a subsystem on the same semiconductor die as host 122 and interface 125 uses on-chip interconnections such as a bus or fabric. In additional embodiments, verifier integrated circuit may be co-packaged with host 122 in a multi-chip module and/or chiplet based approach.

NVM 111 is operatively coupled to interface 115 and key calculation circuitry 113. NVM is operatively coupled to interface 115 to provide a public key 131 stored in NVM 111 to verifier integrated circuit 120. NVM 111 is operatively coupled to key calculation circuitry 113 to provide a private keysplit value 133 stored in NVM 111 to key calculation circuitry 113. It should be understood that in some embodiments, public key 131 is contained within a certificate structure (e.g., X.509), such that a verifier chip 120 receiving public key 131 can verify its authenticity prior to relying on it for any security purposes.

When present, PUF circuitry 112 is operatively coupled to key calculation circuitry 113. PUF circuitry 112 is operatively coupled to key calculation circuitry 113 to provide a private keysplit value 132 to key calculation circuitry 113. In an embodiment, PUF circuitry 112 generates a private keysplit value 132 value based on chip-unique variations of the physical characteristics (e.g., resistance, capacitance, threshold voltage, connectivity, etc.) of PUF circuitry 112. PUF circuitry 112 may additionally include one or more tamper prevention (i.e., shielding) structures. The physical characteristics depend on random physical factors introduced during manufacturing. This causes the chip-to-chip variations in these physical characteristics to be unpredictable and uncontrollable which makes it virtually impossible to duplicate, clone, or modify PUF circuitry 112 and/or the tamper prevention structures without changing the private keysplit value 132.

Proof-of-work ("POW") circuitry 114 is operatively coupled to interface 115, key calculation circuitry 113, and PKE circuitry 116. POW circuitry 114 is operatively coupled to interface 115 to receive, from verifier integrated circuit 120, at least a first challenge value. POW circuitry 114 is operatively coupled to PKE circuitry 116 to provide PKE circuitry 116 with a modified challenge value that is based at least on the challenge value received from verifier integrated circuit 120. POW circuitry 114 is operatively coupled to key calculation circuitry 113 to provide key calculation circuitry 113 with a key multiplier value that is based at least on the challenge value received from verifier integrated circuit 120. In some embodiments, the POW circuitry 114 may also be operatively coupled to random number generator circuitry 117. In such embodiments, both verifier chip 120 and the prover chip 110 may contribute separate nonces ("numbers only used once") that together form a first challenge value.

In an embodiment, POW circuitry 114 and POW circuitry 124 implement, in hardware, a computational function that is difficult to cost-effectively emulate in software. POW circuitry 114 and POW circuitry 124 implement the same computational function. For example, POW circuitry 114 and POW circuitry 124 may both implement, using a large number of combinational logic circuits, an unbalanced Feistel cipher (a.k.a., an Entropic Array) that is difficult for a low-cost microcontroller unit (MCU) to emulate. POW circuitry 114 may derive both the modified challenge value supplied to PKE circuitry 116 and the key multiplier value supplied to key calculation circuitry 113 from the challenge value received from verifier integrated circuit 120.

Key calculation circuitry 113 is operatively coupled to public key computational circuitry (PKE) 116 and to RNG 117. Key calculation circuitry 113 is operatively coupled to RNG 117 to receive a random number value that helps mask the operations performed by key calculation circuitry 113 from SCA attacks. Key calculation circuitry 113 is operatively coupled to PKE circuitry 116 to provide an ephemeral key value that is used by PKE circuitry 116 to encrypt or sign the modified challenge value. PKE circuitry 116 is operatively coupled to interface 115 to provide an encrypted or signed version of the modified challenge value back to verifier integrated circuit 120. In some embodiments, the public key computational circuitry 116 may implemented using a general-purpose MCU circuitry. In other embodiments, a purpose-built public key encryption hardware-accelerator may be used.

Figure 1B:
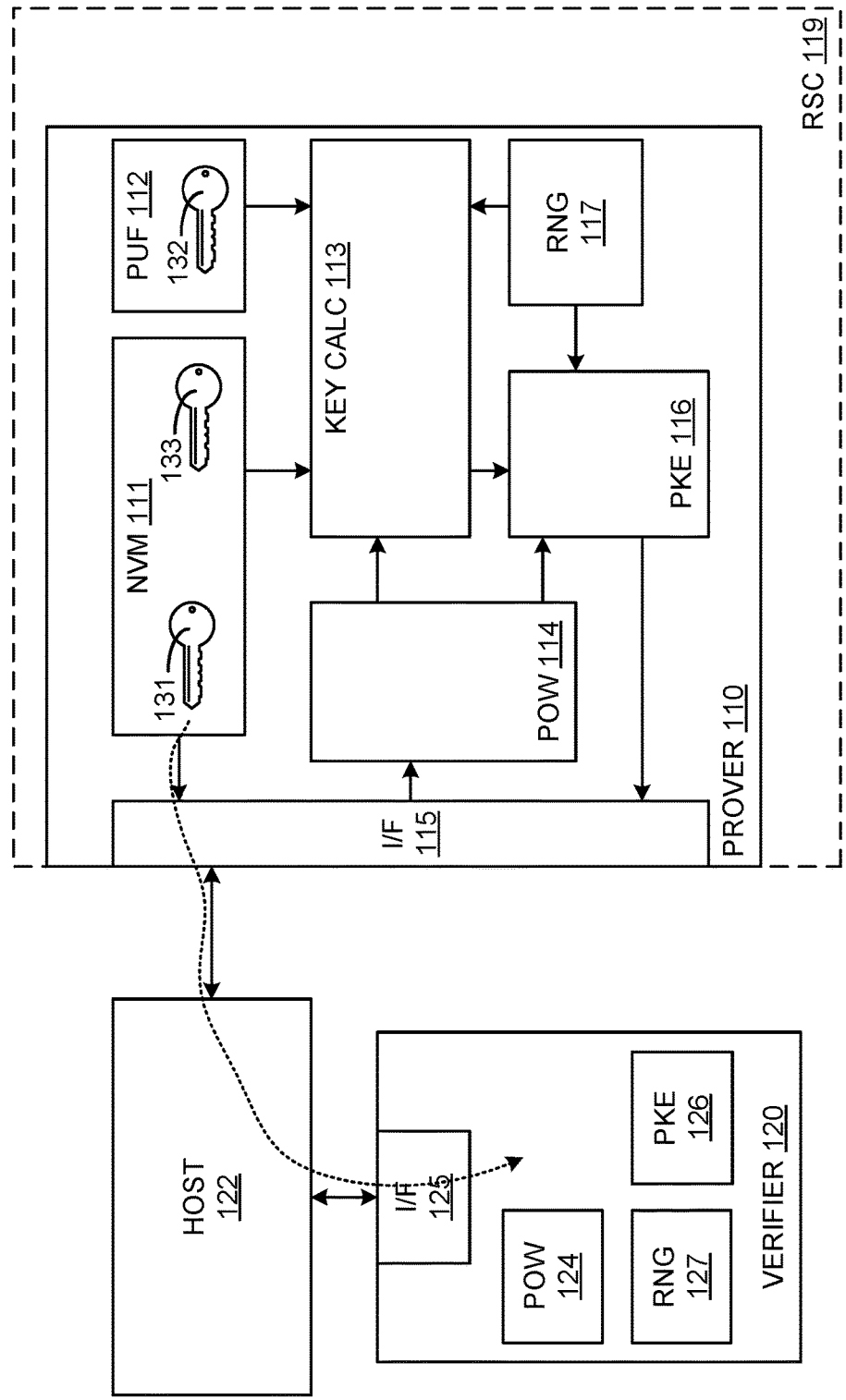

The functioning of the components of system 100 is further discussed herein with reference to FIGS. 1B-1F. To start an authentication process, verifier integrated circuit 120 requests a certificate containing public key 131 from prover integrated circuit 110. Prover integrated circuit 110 provides a certificate containing public key 131 to verifier integrated circuit 120. This is illustrated in FIG. 1B by the arrow running from NVM 111 to verifier integrated circuit 120 via host 122. In an embodiment, the certificate containing public key 131 is signed (e.g., during prover-chip manufacturing) by a previously trusted signing key, such as one generated by the manufacturer of system 100. Verifier 120 may then confirm the validity of the public key 131 provided by prover integrated circuit 110 by verifying the signature on the certificate. In some embodiments, in addition to the certificate, prover chip 110 may also return a nonce value that was generated based at least in part on a value from random number generator 117.

Figure 1C:
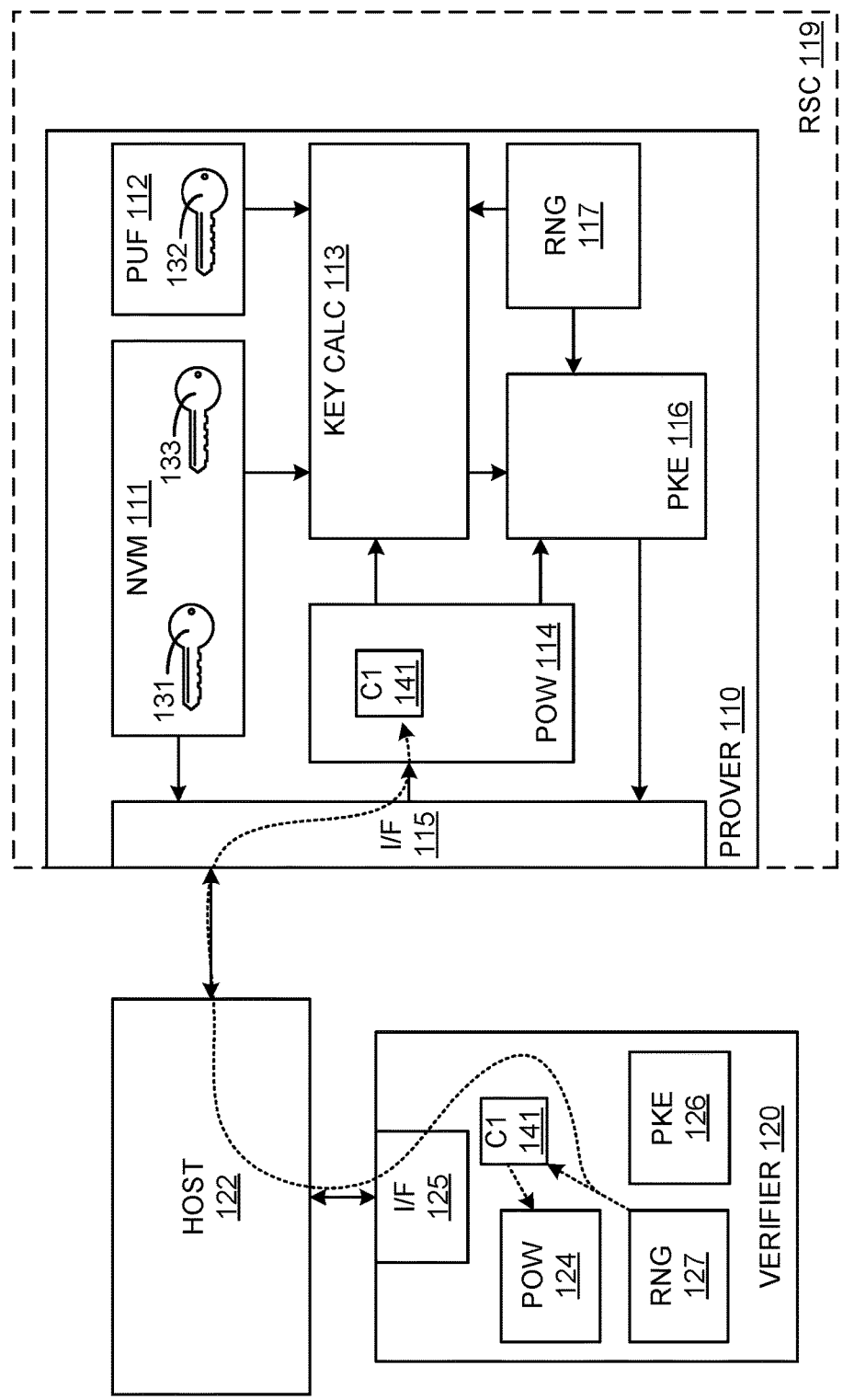

Verifier integrated circuit 120 generates a first challenge value 141 based at least in part on a nonce value produced by RNG 127. This is illustrated in FIG. 1C by the arrow running from RNG 127 to the first challenge value 141 in verifier integrated circuit 120. In some embodiments, the first challenge value may be derived from a combination of a nonce produced by RNG 127 and a nonce produced by RNG 117. Verifier integrated circuit 120 provides the first challenge value 141 to POW circuitry 124. This is illustrated in FIG. 1C by the arrow running from first challenge value 141 to POW circuitry 124. Verifier integrated circuit 120 also transmits the nonce value generated by RNG 127 to prover integrated circuit 110. Prover integrated circuit 110 receives the nonce value via interface 115 and uses it to derive the first challenge value 141 which is provided to POW circuitry 114. In this way, both the POW circuits on the verifier and prover chips (POW circuits 124 and 114 respectively) receive the same first challenge value. This is illustrated in FIG. 1C by the arrow running from RNG 127 to first challenge value 141 in POW circuitry 114.

Figure 1D:
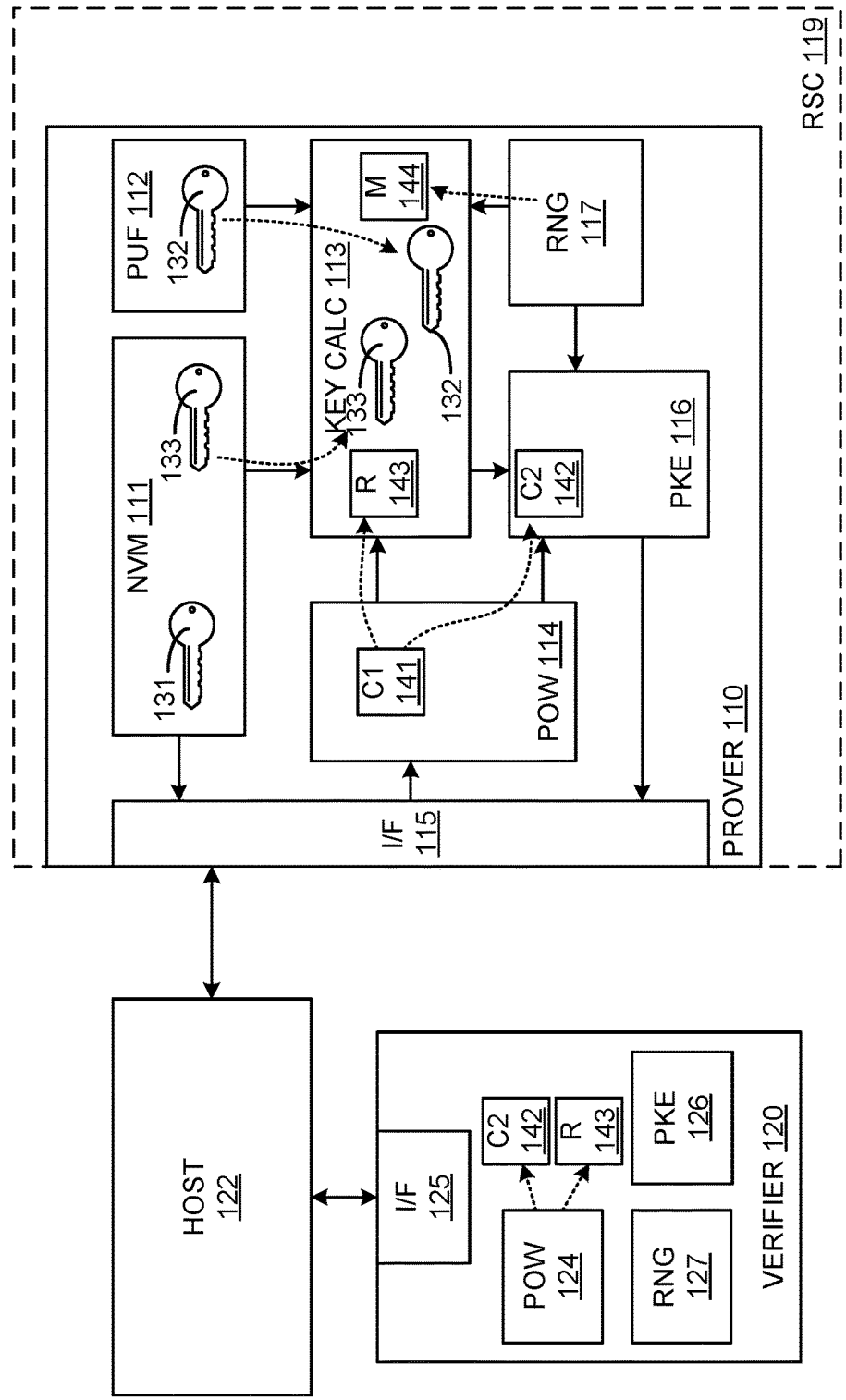

POW circuitry 114 derives, based at least on the first challenge value 141, a second challenge value 142 and a key multiplier value 143. The second challenge value is provided to PKE circuitry 116. Key multiplier value 143 is provided to key calculation circuitry 113. This is illustrated in FIG. 1D by the arrows from the first challenge value 141 in POW circuitry 114 running to the second challenge value 142 in PKE circuitry 116 and the key multiplier value 143 in key calculation circuitry 113. POW circuitry 124 also derives, based at least on the first challenge value 141, copies of the second challenge value 142 and the key multiplier value 143. This is illustrated in FIG. 1D by the arrows running from POW circuitry 124 to, in verifier integrated circuit 120, the second challenge value 142 and the key multiplier value 143.

Key calculation circuitry 113 receives private keysplit value 133 from NVM 111. This is illustrated in FIG. 1D by the arrow running from private keysplit value 133 in NVM 111 to private keysplit value 133 in key calculation circuitry 113. When PUF circuitry 112 is included, key calculation circuitry 113 also receives private keysplit value 132 from PUF circuitry 112. This is illustrated in FIG. 1D by the arrow running from private keysplit value 132 in PUF circuitry 112 to private keysplit value 132 in key calculation circuitry 113. Key calculation circuitry 113 also receives a random mask value 144 from RNG 117. This is illustrated in FIG. 1D by the arrow running from RNG 117 to mask value 144 in key calculation circuitry 113.

Figure 1E:
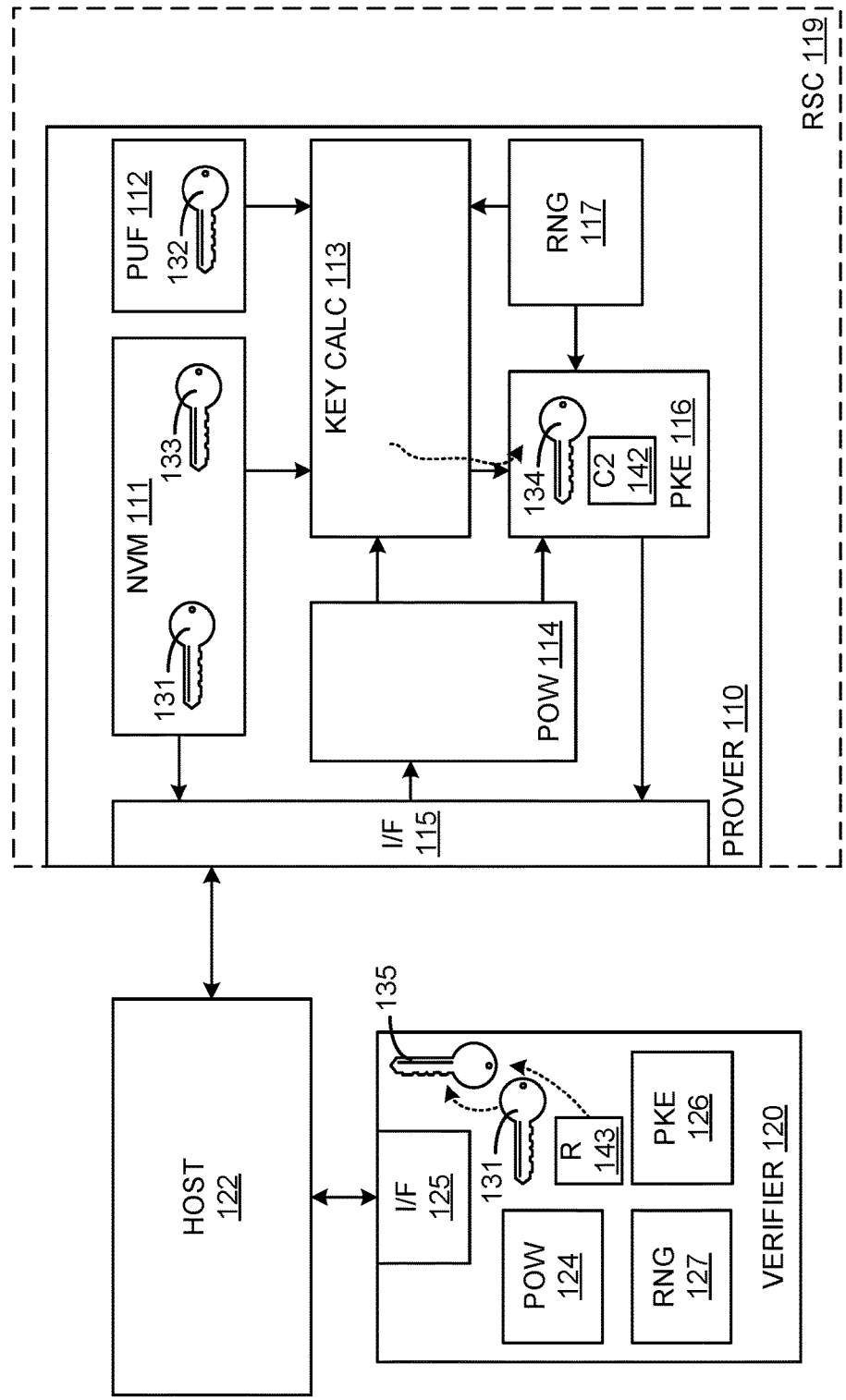

Based on private keysplit value 133, private keysplit value 132 (when used), key multiplier value 143, and optional random mask value 144, key calculation circuitry 113 generates an ephemeral private key 134 and provides ephemeral private key 134 to PKE circuitry 116. This is illustrated in FIG. 1E by the arrow running from key calculation circuitry 113 to ephemeral private key 134 in PKE circuitry 116. When generating ephemeral private key 134, key calculation circuitry 113 may use mask value 144 from RNG 117 to help protect the operations performed by key calculation circuitry 113 from SCA attacks.

The functions/operations performed by key calculation circuitry 113 to generate ephemeral private key 134 are illustrated in Table 1. Because random mask value 144 is randomly generated and therefore different for each authentication, the functions/operations performed by key calculation circuitry 113 to generate ephemeral private key 134 as illustrated in Table 1 are SCA masked.

In Tables 1 and 2, elliptic curve points are represented with capital letters and scalars are represented by lower case letters. Thus, for example, adding the points "P" and "Q" to get the resulting point "R" on an elliptic curve that uses a prime "p" to define the field over which the elliptic curve is defined, would be written in Table 1 as "R=P+Q" the "+" operator represents elliptic curve addition of two points. Similarly, multiplying the point "P" by a scalar "s" to get the resulting point "R" would be written as "R=s×P" where the "x" operator represents adding the point "P" to itself "s" times. When two scalar values are added or multiplied (e.g., a+c=c) the "+" operator and "x" operator have their customary mathematical meanings.

In Tables 1 and 2, "s" is a scalar private key value derived from private keysplit value 133 and, when used, private keysplit value 132. For example, "s" may be a private key value generated by concatenating private keysplit value 133 and private keysplit value 132. Also, in Table 1: "m" is the scalar random mask value 144; "r" is the scalar the key multiplier value 143; "n" is the order of the elliptic curve group; "G" is the generator or base point for public key 131; and s' is ephemeral private key 134; and P' is ephemeral public key 135 that corresponds to ephemeral private key 134. Note that because the value of r is derived from the first challenge value 141, which is based on a random number generated by verifier integrated circuit 120, the value of ephemeral private key 134 (s') which is based on r is almost statistically certain to be different for each authentication.

TABLE 1

(a) compute intermediate masked value $s_1 = r \times (m + s) \mod(n)$.
(b) compute intermediate masked value $s_2 = r \times m \mod(n)$.
(c) compute ephemeral private key $s' = s_1 - s_2 \mod (n)$.

Based on public key 131 and key multiplier value 143, verifier integrated circuit 120 generates an ephemeral public key 135 that corresponds to ephemeral private key 134. This is illustrated in FIG. 1E by the arrows running from key multiplier value 143 and public key 131 to ephemeral public key 135. The functions/operations performed by verifier integrated circuit 120 to generate ephemeral public key 135 are illustrated in Table 2. Note that verifier integrated circuit 120 is able to obtain the value for scalar the key multiplier value 143 (r) by processing the first challenge value 141 through POW circuitry 124 because POW circuitry 124 and POW circuitry 114 perform the same derivation.

TABLE 2

(a) compute ephemeral public key $P' = r \times P$.

Figure 1F:
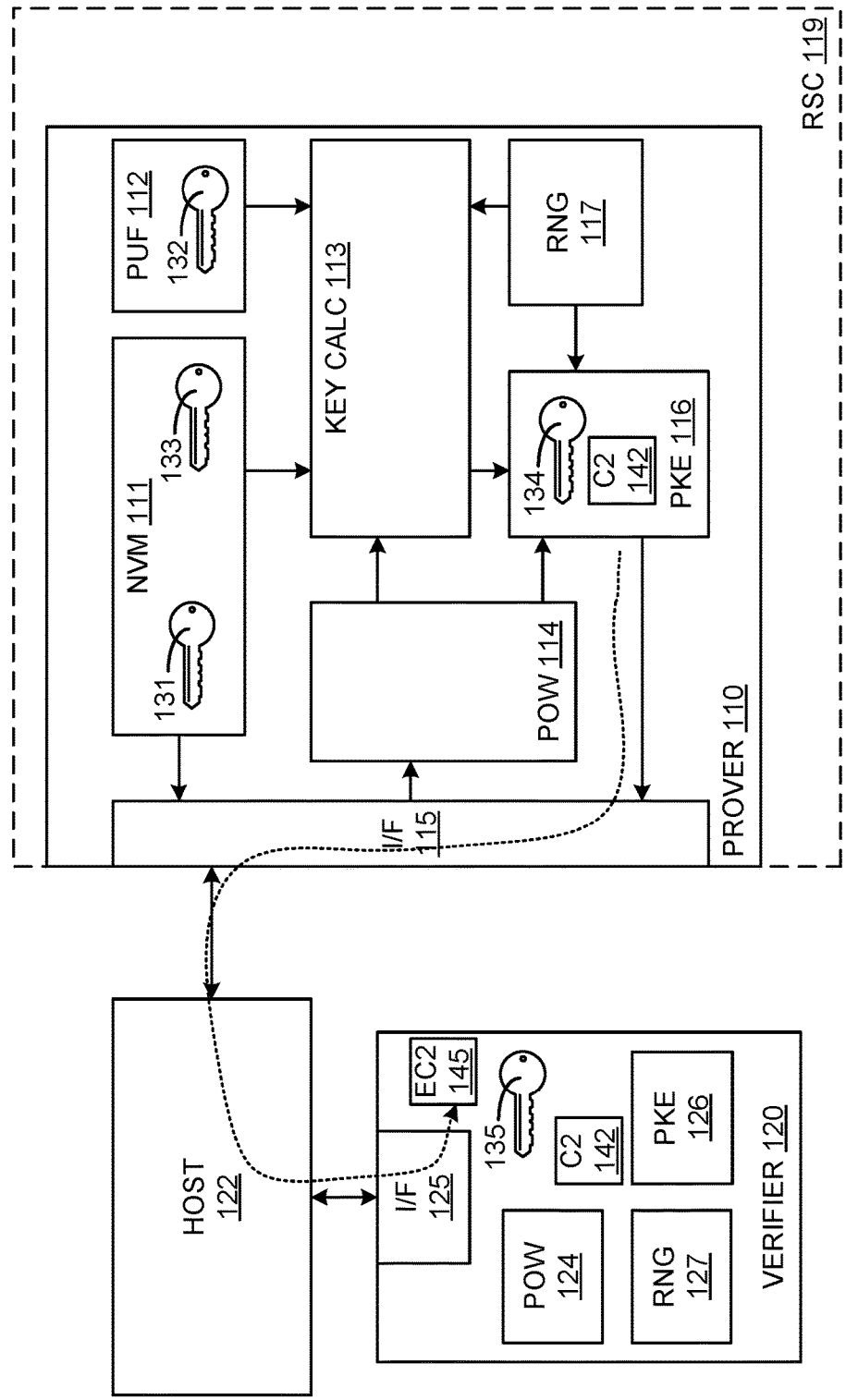

PKE circuitry 116 encrypts or signs the second challenge value 142 using ephemeral private key 134 and transmits the output as response value 145 as a response to verifier integrated circuit 120. This is illustrated in FIG. 1F by the arrow running from PKE circuitry 116 to verifier integrated circuit 120. Verifier integrated circuit 120 decrypts or verifies the response value 145 using ephemeral public key 135 to determine whether prover integrated circuit 110 is authentic. In other words, if the value obtained by decrypting the response value 145 does not match the second challenge value 142 (in the case of PKE circuitry 116 performing an encryption) or match a digest (e.g., a cryptographic hash) of the second challenge value 142 (in the case of PKE circuitry 116 performing signature generation) received as a result of POW circuitry 124 processing first challenge value 141, then prover integrated circuit 110 has failed authentication and prover integrated circuit 110 will not be authenticated to system 100 as being authentic.

Figure 2:
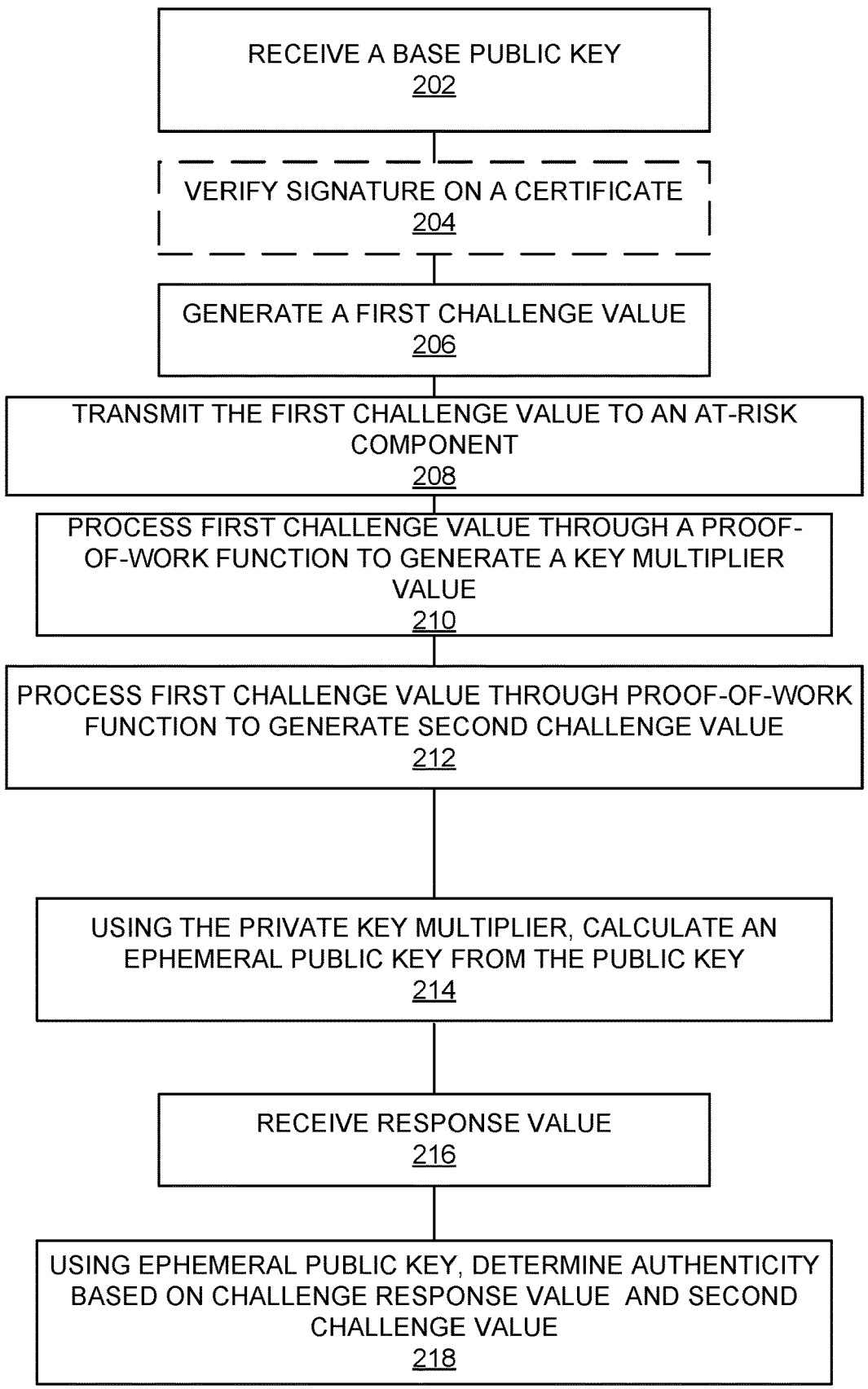
FIG. 2 is a flowchart illustrating a method of determining authenticity using the public key of an asymmetric keypair.

FIG. 2 is a flowchart illustrating a method of determining authenticity using the public key of an asymmetric keypair. One or more steps illustrated in FIG. 2 may be performed by, for example, system 100 and/or its components. A public key is received (202). For example, verifier integrated circuit 120 may receive, from prover integrated circuit 110, a public key 131. The public key 131 may be included in a signed certificate. Thus, optionally, the signature on a certificate is verified (204). For example, verifier integrated circuit 120 may use public key cryptography techniques to confirm the public key received from prover integrated circuit 110 is a valid public key and/or has not been tampered with. PKE circuitry 126 may be used by verifier integrated circuit 120 to confirm the validity of the public key 131 provided by prover integrated circuit 110.

A first challenge value is generated (206). For example, verifier integrated circuit 120 may generate a first challenge value 141 based at least on a value produced by RNG 127. In another example, as described herein, the first challenge value 141 may also be based on a nonce produced by RNG 117 and received by verifier integrated circuit 120. The first challenge value is transmitted to the at-risk system component (208). For example, verifier integrated circuit 120 may transmit first challenge value 141 to prover integrated circuit 110 via host 122 and RSC 119.

The first challenge value is processed through a proof-of-work function to generate a private key multiplier (210). For example, verifier integrated circuit 120 may provide the first challenge value 141 to POW circuitry 124. POW circuitry 124 then derives, based at least on the first challenge value 141, a key multiplier value 143. The first challenge value is processed through the proof-of-work function to generate a second challenge value (212). For example, POW circuitry 124 may also derive, based at least on the first challenge value 141, a second challenge value 142.

Using the key multiplier, an ephemeral public key is calculated from the public key (214). For example, based on public key 131 and key multiplier value 143, verifier integrated circuit 120 generates an ephemeral public key 135 that corresponds to ephemeral private key 134. A challenge response value is received (216). For example, verifier integrated circuit 120 may receive, from prover integrated circuit 110, a response value 145 that prover integrated circuit 110 has generated (e.g., via an encrypting or signing operation using the ephemeral private key 134) from the second challenge value 142.

Based on the response value and the second challenge value, and using the ephemeral public key, authenticity is determined (218). For example, verifier integrated circuit 120 may verify the response value 145 received from prover integrated circuit 110 using ephemeral public key 135 to determine whether prover integrated circuit 110 is authentic. If prover integrated circuit 110 fails authentication, prover integrated circuit 110 will not be authenticated to system 100.

Figure 3:
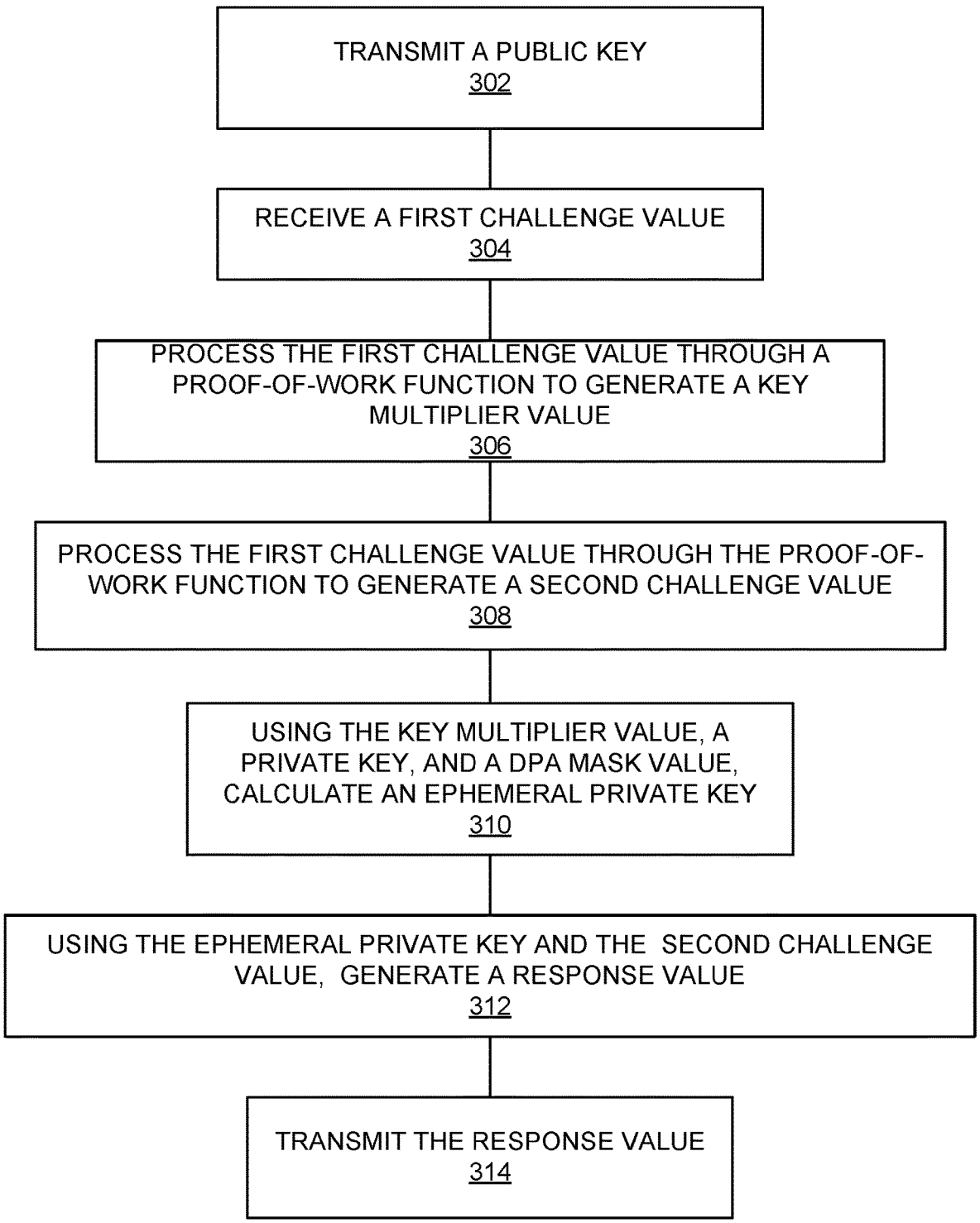
FIG. 3 is a flowchart illustrating a method of a component proving its authenticity to a system using a private key of an asymmetric keypair.

FIG. 3 is a flowchart illustrating a method of a component proving its authenticity to a system using a private key of an asymmetric keypair. One or more steps illustrated in FIG. 3 may be performed by, for example, system 100 and/or its components. A public key is transmitted (302). For example, prover integrated circuit 110 may transmit public key 131 to verifier integrated circuit 120. Prover integrated circuit 110 may transmit public key 131 to verifier integrated circuit 120 in a signed and/or encrypted certificate that allows verifier integrated circuit 120 to confirm that public key 131 has not been altered and/or otherwise tampered with.

A first challenge value is received (304). For example, prover integrated circuit 110 may receive, from verifier integrated circuit 120, a first challenge value 141 via interface 115. The first challenge value is processed through a proof-of-work function to generate a key multiplier value (306). The first challenge value is processed through the proof-of-work function to generate a second challenge value (308). For example, POW circuitry 114 may derive, based at least on the first challenge value 141, a second challenge value 142. It should be understood that POW circuitry 114 may concurrently derive the key multiplier value and the second challenge value from the first challenge value.

Using the key multiplier value, a private key, and a SCA mask value, an ephemeral private key is calculated (310). For example, based on private keysplit value 133, private keysplit value 132 (when used), and key multiplier value 143, key calculation circuitry 113 may generate ephemeral private key 134. Using the ephemeral private key and the second challenge value, a response value is generated (312). For example, PKE circuitry 116 may encrypt the second challenge value 142 using ephemeral private key 134 to produce a response value 145. In another example, PKE circuitry 116 may sign the second challenge value 142 using ephemeral private key 134 to produce a response value 145.

The response value is transmitted (314). For example, prover integrated circuit 110 may transmit response value 145 to verifier integrated circuit 120. Verifier integrated circuit 120 may verify response value 145 using ephemeral public key 135 to determine whether prover integrated circuit 110 is authentic. If prover integrated circuit 110 fails authentication, prover integrated circuit 110 will not be authenticated to system 100 as being authentic.

Figure 4A:
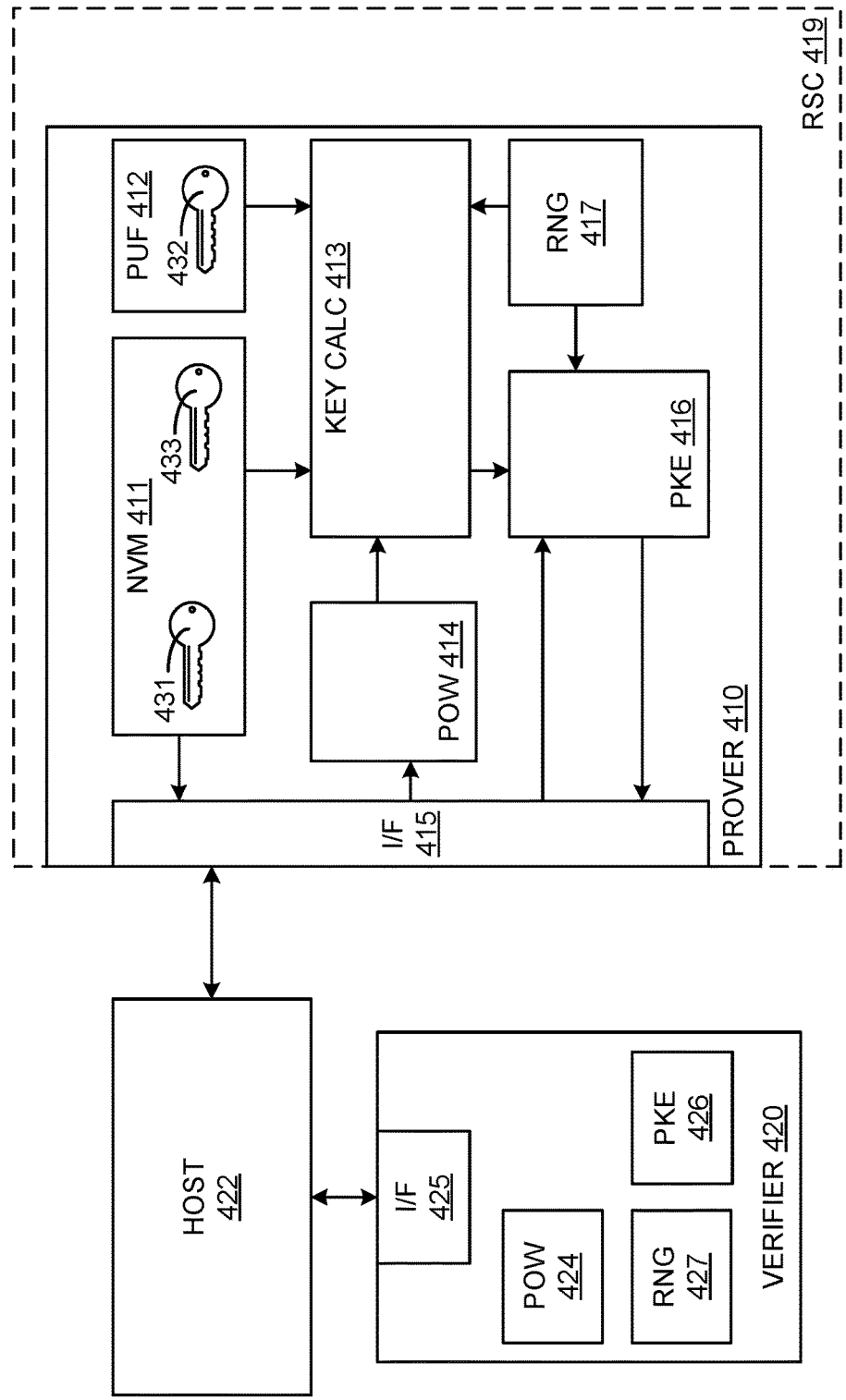
FIGS. 4A-4F are block diagrams illustrating authentication of an at-risk system component.

FIGS. 4A-4F are block diagrams illustrating authentication of an at-risk system component. In FIGS. 4A-1F, system 400 includes verifier integrated circuit 420, host 422, and at-risk system component (RSC) 419. RSC 419 includes prover integrated circuit 410. Prover integrated circuit 410 includes nonvolatile memory (NVM) 411, an optional physically unclonable function (PUF) 412, key calculation circuitry 413, proof-of-work circuitry (POW) 414, interface 415, public key computational circuitry (PKE) 416, and random number generator circuitry (RNG) 417. It should be understood that PUF circuitry 412 may not be included in some embodiments. Verifier integrated circuit 420 includes proof-of-work circuitry (POW) 424, interface 425, public key computational circuitry (PKE) 426, and random number generator circuitry (RNG) 427.

In FIGS. 4A-4F, prover integrated circuit 410 is operatively coupled to host 422 via interface 415. Host 422 is operatively coupled to verifier integrated circuit 420 via interface 425. Thus, prover integrated circuit 410 and verifier integrated circuit 420 may communicate information via host 422. Note that in some embodiments, host 422 and verifier integrated circuit 420 may be different chips and interface 425 is a chip-to-chip interface. In in other embodiments, verifier integrated circuit 420 is a subsystem on the same semiconductor die as host 422 and interface 425 uses on-chip interconnections such as a bus or fabric. In additional embodiments, verifier integrated circuit may be co-packaged with host 422 in a multi-chip module and/or chiplet based approach.

NVM 411 is operatively coupled to interface 415 and key calculation circuitry 413. NVM is operatively coupled to interface 415 to provide a public key 431 stored in NVM 411 to verifier integrated circuit 420. NVM 411 is operatively coupled to key calculation circuitry 413 to provide private keysplit value 433 stored in NVM 411 to key calculation circuitry 413. It should be understood that in some embodiments, public key 431 is contained within a certificate structure (e.g., X.509), such that a verifier chip 420 receiving public key 431 can verify its authenticity prior to relying on it for any security purposes.

When present, PUF circuitry 412 is operatively coupled to key calculation circuitry 413. PUF circuitry 412 is operatively coupled to key calculation circuitry 413 to provide private keysplit value 432 to key calculation circuitry 413. In an embodiment, PUF circuitry 412 generates a private keysplit value 432 value based on chip-unique variations of the physical characteristics (e.g., resistance, capacitance, threshold voltage, connectivity, etc.) of PUF circuitry 412. PUF circuitry 412 may additionally include one or more tamper prevention (i.e., shielding) structures. The physical characteristics depend on random physical factors introduced during manufacturing. This causes the chip-to-chip variations in these physical characteristics to be unpredictable and uncontrollable which makes it virtually impossible to duplicate, clone, or modify PUF circuitry 412 and/or the tamper prevention structures without changing the private keysplit value 432.

Proof-of-work ("POW") circuitry 414 is operatively coupled to interface 415 and key calculation circuitry 413. POW circuitry 414 is operatively coupled to interface 415 to receive, from verifier integrated circuit 420, at least a challenge value. POW circuitry 414 is operatively coupled to key calculation circuitry 413 to provide key calculation circuitry 413 with a key multiplier value that is based at least on the challenge value received from verifier integrated circuit 420. In some embodiments, the POW circuitry 414 may also be operatively coupled to random number generator circuitry 417. In such embodiments, both verifier chip 420 and the prover chip 110 may contribute separate nonces ("numbers only used once") that together form a challenge value.

In an embodiment, POW circuitry 414 and POW circuitry 424 implement, in hardware, a computational function that is difficult to cost-effectively emulate in software. POW circuitry 414 and POW circuitry 424 implement the same computational function. For example, POW circuitry 414 and POW circuitry 424 may both implement, using combinational logic circuits, an unbalanced Feistel cipher (a.k.a., an Entropic Array) that is difficult for a low-cost MCU to cost effectively emulate. POW circuitry 414 may derive both the modified challenge value supplied to PKE circuitry 416 and the key multiplier value supplied to key calculation circuitry 413 from the challenge value received from verifier integrated circuit 420.

Key calculation circuitry 413 is operatively coupled to PKE circuitry 416 and RNG 417. Key calculation circuitry 413 is operatively coupled to RNG 417 to receive a random number value that helps mask the operations performed by key calculation circuitry 413 from SCA attacks. Key calculation circuitry 413 is operatively coupled to PKE circuitry 416 to provide an ephemeral key value that is used by PKE circuitry 416 to encrypt or sign the challenge value. PKE circuitry 416 is operatively coupled to interface 415 to receive, from verifier integrated circuit 420, at least a challenge value and to provide an encrypted or signed version of the challenge value back to verifier integrated circuit 420. In some embodiments, the public key computational circuitry 416 may implemented using a general-purpose MCU circuitry. In other embodiments, a purpose-built public key encryption hardware-accelerator may be used.

Figure 4B:
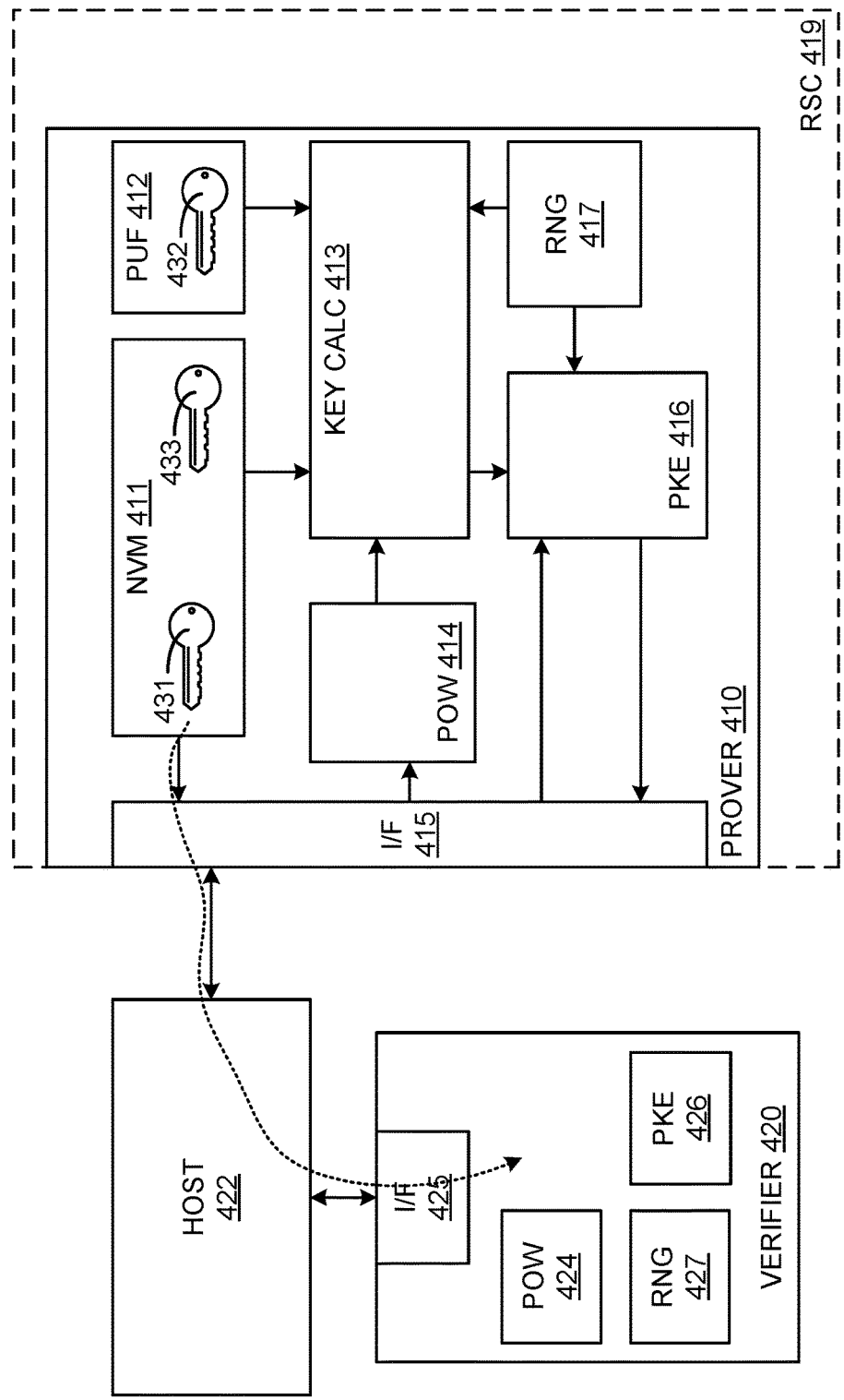

The functioning of the components of system 400 is further discussed herein with reference to FIGS. 4B-4F. To start an authentication process, verifier integrated circuit 420 requests a signed certificate containing public key 431 from prover integrated circuit 410. Prover integrated circuit 410 provides a certificate containing public key 431 to verifier integrated circuit 420. This is illustrated in FIG. 4B by the arrow running from NVM 411 to verifier integrated circuit 420 via host 422. In an embodiment, the certificate containing public key 431 is signed (e.g., during prover chip manufacturing) by a previously trusted signing key, such as one generated by the manufacturer of system 400. Verifier 420 may then confirm the validity of the public key 431 provided by prover integrated circuit 410 by verifying the signature on the certificate. In some embodiments, in addition to the certificate, prover chip 410 may also return a nonce value that was generated based at least in part on a value from random number generator 417.

Figure 4C:
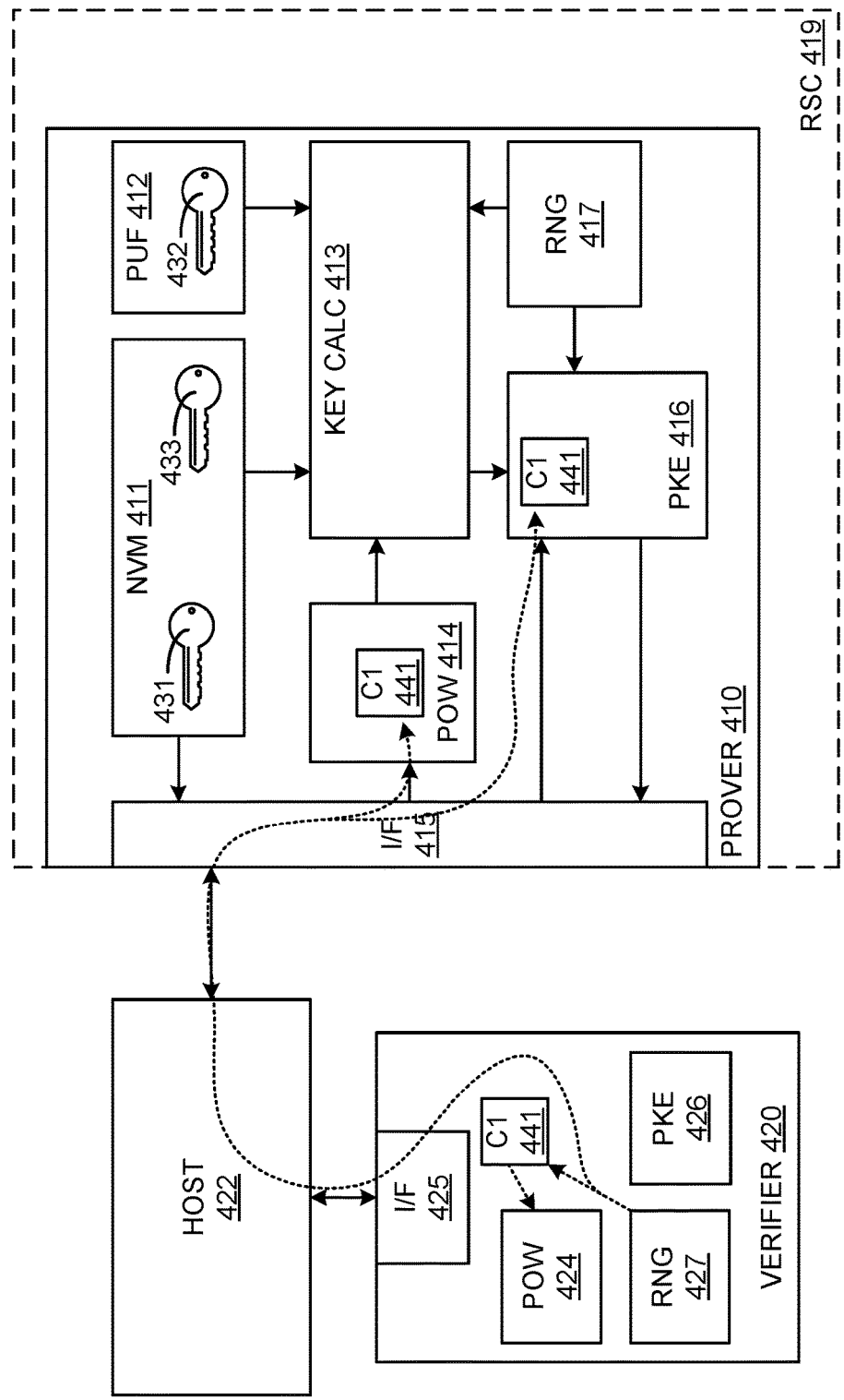

Verifier integrated circuit 420 generates a challenge value 441 based at least in part on a nonce value produced by RNG 427. This is illustrated in FIG. 4C by the arrow running from RNG 427 to the challenge value 441 in verifier integrated circuit 420. In some embodiments, the challenge value may be derived from a combination of a nonce produced by RNG 427 and a nonce produced by RNG 417. Verifier integrated circuit 420 provides the challenge value 441 to POW circuitry 424. Verifier integrated circuit 420 also transmits the challenge value 441 to prover integrated circuit 410. Prover integrated circuit 410 receives the challenge value 441 via interface 415 and uses it to derive the first challenge value 441 which is provided to POW circuitry 414 and PKE circuitry 416. In this way, both the POW circuits on the verifier and prover chips (POW circuits 124 and 114 respectively) receive the same challenge value. This is illustrated in FIG. 4C by the arrows running from RNG 427 to the challenge value 441 in POW circuitry 414 and the challenge value 441 in PKE circuitry 416.

Figure 4D:
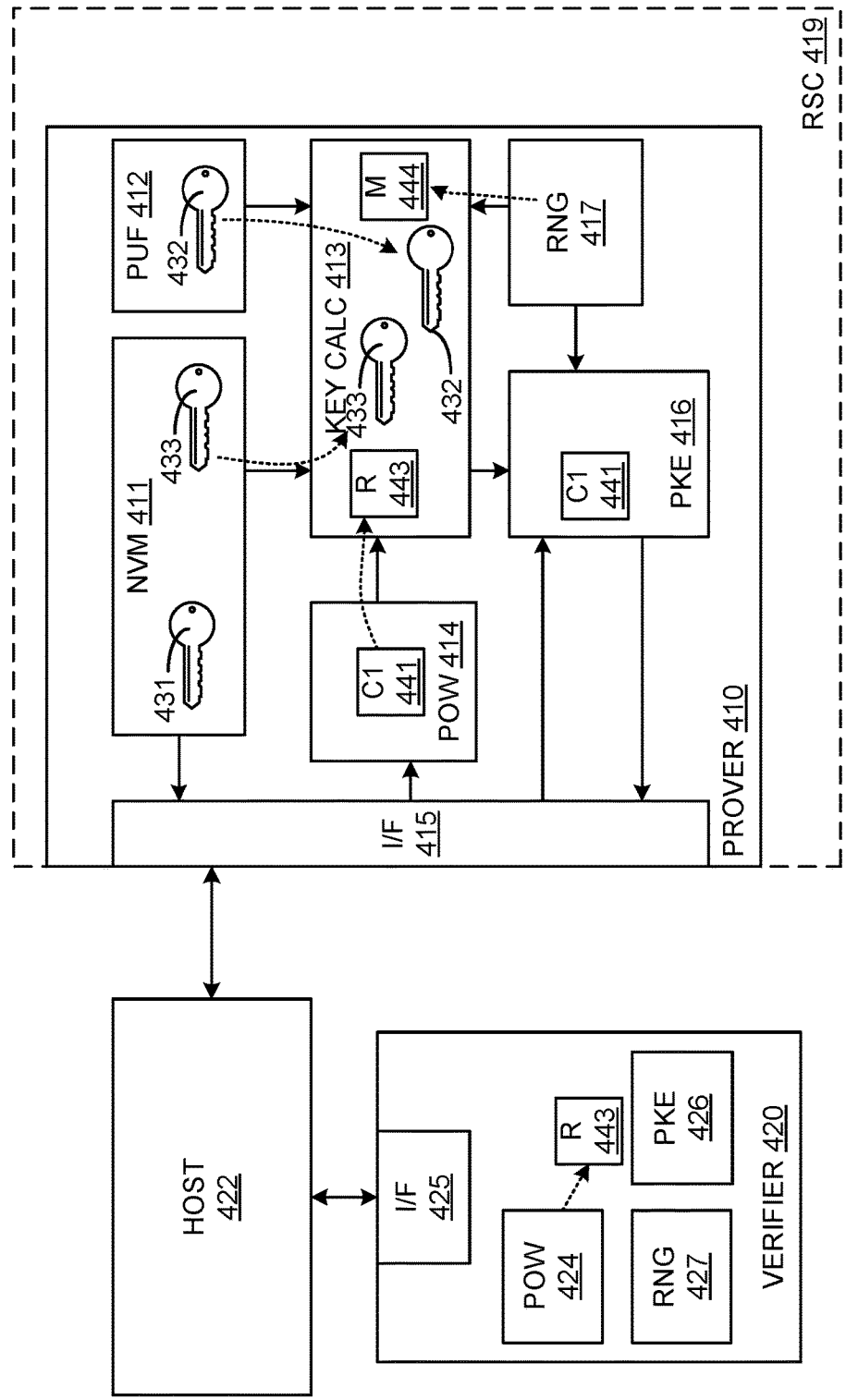

POW 414 derives, based at least on the challenge value 441, key multiplier value 443. Key multiplier value 443 is provided to key calculation circuitry 413. This is illustrated in FIG. 4D by the arrow from the challenge value 441 in POW 414 to the key multiplier value 443 in key calculation circuitry 413. POW circuitry 424 also derives, based at least on the challenge value 441, a copy of the key multiplier value 443. This is illustrated in FIG. 4D by the arrow running from POW circuitry 424 to, in verifier integrated circuit 420, the key multiplier value 443.

Key calculation circuitry 413 receives private keysplit value 433 from NVM 411. This is illustrated in FIG. 4D by the arrow running from private keysplit value 433 in NVM 411 to private keysplit value 433 in key calculation circuitry 413. When PUF circuitry 412 is included, key calculation circuitry 413 also receives private keysplit value 432 from PUF circuitry 412. This is illustrated in FIG. 4D by the arrow running from private keysplit value 432 in PUF circuitry 412 to private keysplit value 432 in key calculation circuitry 413. Key calculation circuitry 413 also receives random mask value 444 from RNG 417. This is illustrated in FIG. 4D by the arrow running from RNG 417 to mask value 444 in key calculation circuitry 413.

Figure 4E:
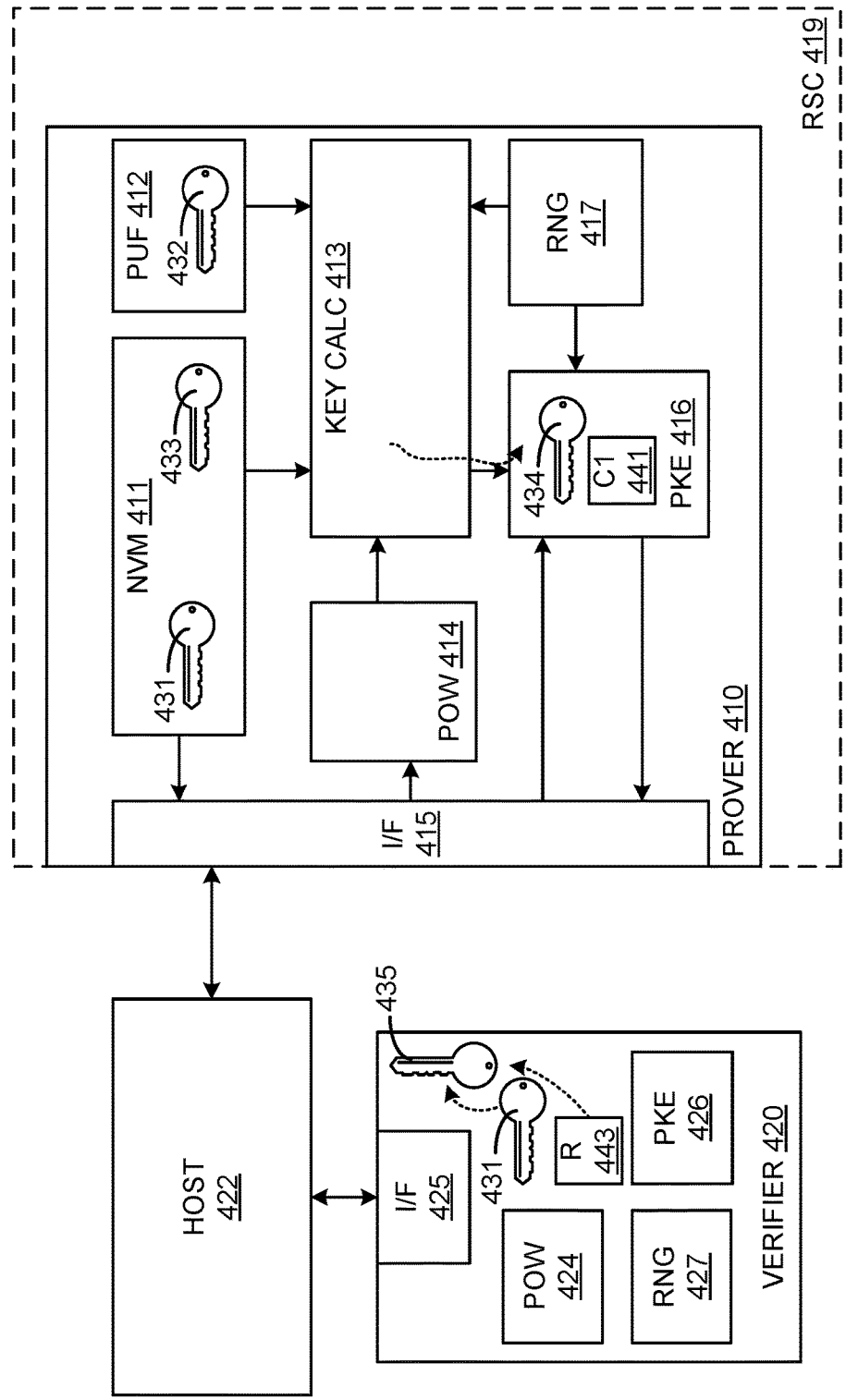

Based on private keysplit value 433, private keysplit value 432 (when used), key multiplier value 443, and optional random mask value 444, key calculation circuitry 413 generates an ephemeral private key 434 and provides ephemeral private key 434 to PKE circuitry 416. This is illustrated in FIG. 4E by the arrow running from key calculation circuitry 413 to ephemeral private key 434 in PKE circuitry 416. When generating ephemeral private key 434, key calculation circuitry 413 may use mask value 444 from RNG 417 to help protect the operations performed by key calculation circuitry 413 from SCA attacks.

The functions/operations performed by key calculation circuitry 413 to generate ephemeral private key 434 are illustrated in Table 3. Because mask value 344 is randomly generated and therefore different for each authentication, the functions/operations performed by key calculation circuitry 413 to generate ephemeral private key 434 as illustrated in Table 3 are SCA masked.

Like Tables 1 and 2, in Tables 3 and 4, elliptic curve points are represented with capital letters and scalars are represented by lower case letters. Also, like Tables 1 and 2, for example, adding the points "P" and "Q" to get the resulting point "R" on an elliptic curve that uses a prime "p" to define the field over which the elliptic curve is defined, would be written in Table 1 as "R=P+Q" the "+" operator represents elliptic curve addition of two points. Similarly, multiplying the point "P" by a scalar "s" to get the resulting point "R" would be written as "R=s×P" where the "×" operator represents adding the point "P" to itself "s" times. When two scalar values are added or multiplied (e.g., a+c=c) the "+" operator and "×" operator have their customary mathematical meanings.

In Tables 3 and 4, "s" is a scalar private key value derived from private keysplit value 433 and, when used, private keysplit value 432. For example, "s" may be a private key value generated by concatenating private keysplit value 433 and private keysplit value 432. Also, in Table 1: "m" is the scalar random mask value 444; "r" is the scalar the key multiplier value 443; "n" is the order of the elliptic curve group; "G" is the generator or base point for public key 431; and s' is ephemeral private key 434; and P' is ephemeral public key 435 that corresponds to ephemeral private key 434. Note that because the value of r is derived from the challenge value 441, which is based on a random number generated by verifier integrated circuit 420, the value of ephemeral private key 434 (s') which is based on r is almost statistically certain to be different for each authentication.

TABLE 3

(a) compute intermediate masked value $s_1 = r \times (m + s) \bmod(n)$.
(b) compute intermediate masked value $s_2 = r \times m \bmod(n)$.
(c) compute ephemeral private key $s' = s_1 - s_2 \bmod(n)$.

Based on public key 431 and key multiplier value 443, verifier integrated circuit 420 generates an ephemeral public key 435 that corresponds to ephemeral private key 434. This is illustrated in FIG. 4E by the arrows running from key multiplier value 443 and public key 431 to ephemeral pubic key 435. The functions/operations performed by verifier integrated circuit 420 to generate ephemeral public key 435 are illustrated in Table 2. Note that verifier integrated circuit 420 is able to obtain the value for scalar the key multiplier value 443 ($r$) by processing the challenge value 441 through POW circuitry 424 because POW circuitry 424 and POW circuitry 414 perform the same derivation.

TABLE 4

(a) compute ephemeral public key P' = r × P.

Figure 4F:
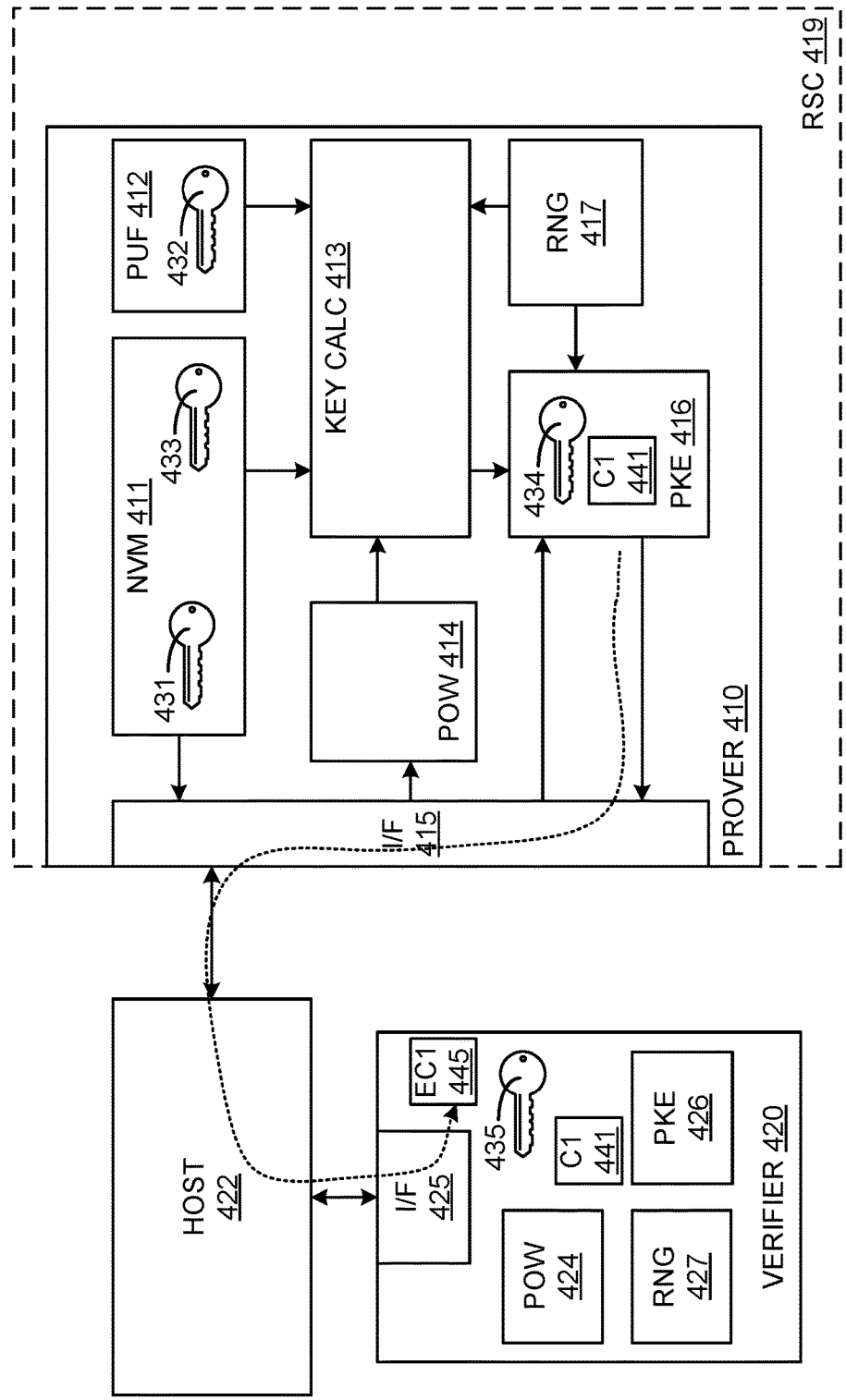

PKE circuitry 416 encrypts or signs the challenge value 441 using ephemeral private key 434 and transmits the output as response value 445 to verifier integrated circuit 420. This is illustrated in FIG. 4F by the arrow running from PKE circuitry 416 to verifier integrated circuit 420. Verifier integrated circuit 420 may decrypts or verifies the response value 445 using ephemeral public key 435 to determine whether prover integrated circuit 410 is authentic. In other words, if the value obtained by decrypting the response value 445 does not match the challenge value 441 (in the case of PKE circuitry 416 performing an encryption) or match a digest (e.g., a cryptographic hash) of the challenge value 441 (in the case of PKE circuitry 416 performing signature generation), then prover integrated circuit 410 has failed authentication and prover integrated circuit 410 will not be authenticated to system 400 as being authentic.

Figure 5:
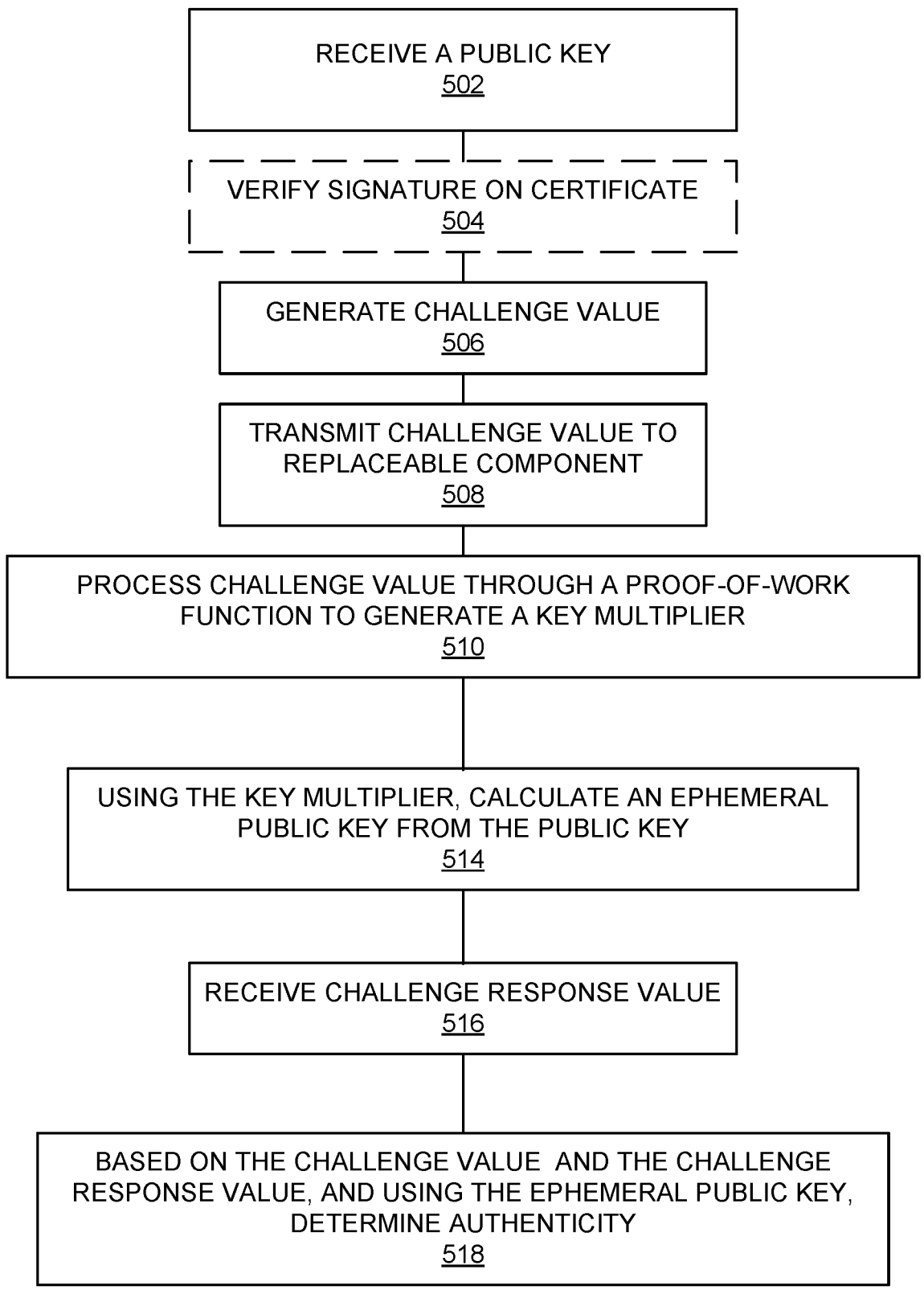
FIG. 5 is a flowchart illustrating a method of determining authenticity using the public key of an asymmetric keypair.

FIG. 5 is a flowchart illustrating a method of determining authenticity using the public key of an asymmetric keypair. One or more steps illustrated in FIG. 5 may be performed by, for example, system 400 and/or its components. A public key is received (502). For example, verifier integrated circuit 420 may receive, from prover integrated circuit 410, a public key 431. The public key 431 may be included in a signed certificate. Thus, optionally, the signature on a certificate is verified (504). For example, verifier integrated circuit 420 may use public key cryptography techniques to confirm the public key received from prover integrated circuit 410 is a valid public key and/or has not been tampered with. PKE circuitry 426 may be used by verifier integrated circuit 420 to confirm the validity of the public key 431 provided by prover integrated circuit 410.

A challenge value is generated (506). For example, verifier integrated circuit 420 may generate a challenge value 441 based at least on a value produced by RNG 427. In another example, as described herein, the challenge value 441 may also be based on a nonce produced by RNG 417 and received by verifier integrated circuit 420. The challenge value is transmitted to the at-risk component (508). For example, verifier integrated circuit 420 may transmit challenge value 441 to prover integrated circuit 410 via host 422 and RSC 419.

The challenge value is processed through a proof-of-work function to generate a private key multiplier (510). For example, verifier integrated circuit 420 may provide the challenge value 441 to POW circuitry 424. POW circuitry 424 then derives, based at least on the challenge value 441, a key multiplier value 443.

Using the private key multiplier, an ephemeral public key is calculated from the public key (514). For example, based on public key 431 and key multiplier value 443, verifier integrated circuit 420 generates an ephemeral public key 435 that corresponds to ephemeral private key 434. A challenge response value is received (516). For example, verifier integrated circuit 420 may receive, from prover integrated circuit 410, a response value 445 that prover integrated circuit 410 has generated (e.g., via an encrypting or signing operation using the ephemeral private key 134) from the challenge value 441.

Based on the challenge response value and the challenge value, and using the ephemeral public key, authenticity is determined (518). For example, verifier integrated circuit 420 may verify the response value 445 received from prover integrated circuit 410 using ephemeral public key 435 to determine whether prover integrated circuit 410 is authentic. If prover integrated circuit 410 fails authentication, prover integrated circuit 410 will not be authenticated to system 400.

Figure 6:
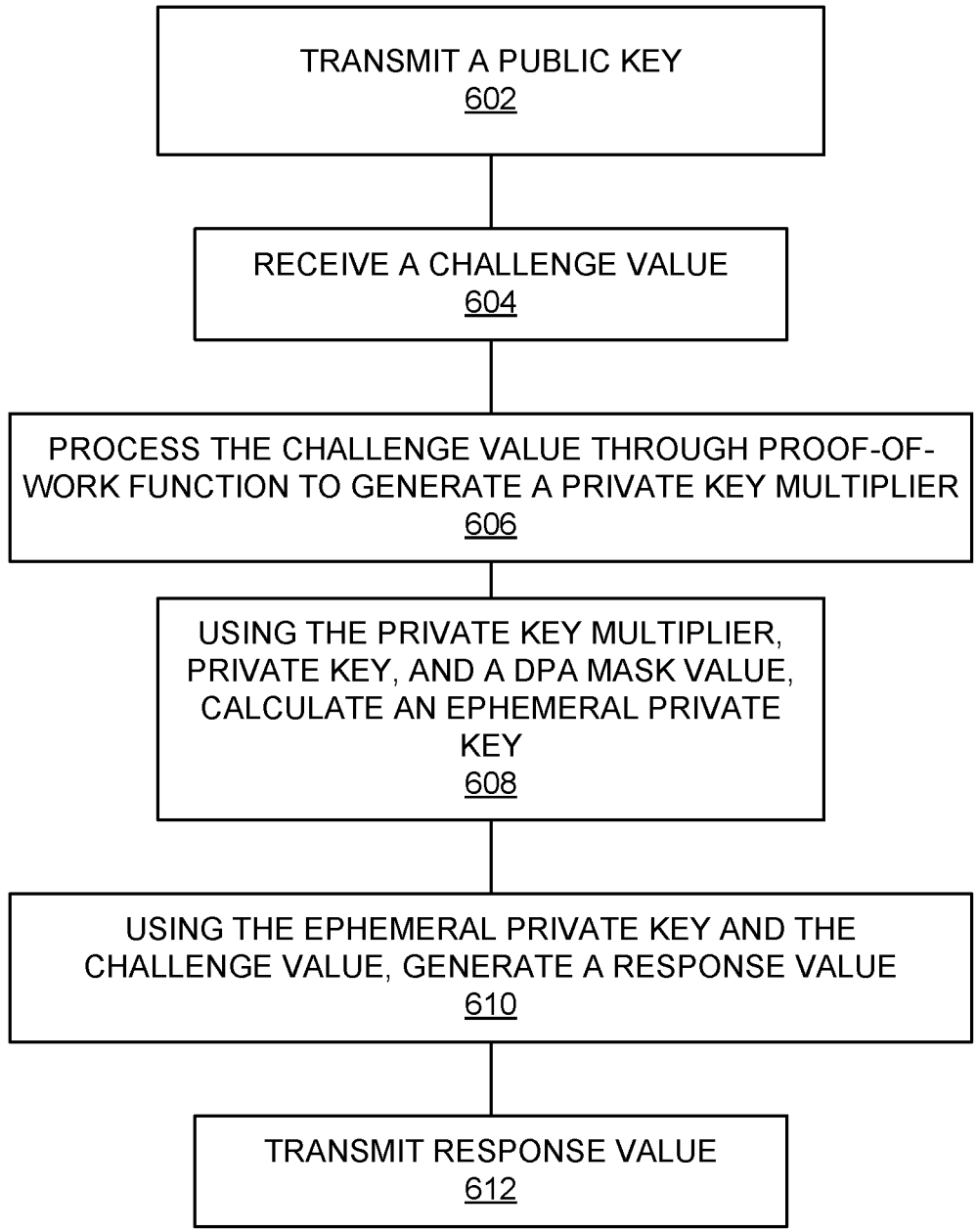
FIG. 6 is a flowchart illustrating a method of a component proving its authenticity to system using a private key of an asymmetric keypair.

FIG. 6 is a flowchart illustrating a method of a component proving its authenticity to system using a private key of an asymmetric keypair. One or more steps illustrated in FIG. 6 may be performed by, for example, system 400 and/or its components. A public key is transmitted (602). For example, prover integrated circuit 410 may transmit public key 431 to verifier integrated circuit 420. Prover integrated circuit 410 may transmit public key 431 to verifier integrated circuit 420 in a signed and/or encrypted certificate that allows verifier integrated circuit 420 to confirm that public key 431 has not been altered and/or otherwise tampered with.

A challenge value is received (604). For example, prover integrated circuit 410 may receive, from verifier integrated circuit 420, a challenge value 441 via interface 415. The challenge value is processed through a proof-of-work function to generate a key multiplier value (606).

Using the key multiplier value, a private key, and a SCA mask value, an ephemeral private key is calculated (608). For example, based on private keysplit value 433, private keysplit value 432 (when used), and key multiplier value 443, key calculation circuitry 413 may generate ephemeral private key 434. Using the ephemeral private key and the challenge value a response value is generated (610). For example, PKE circuitry 416 may encrypt the challenge value 441 using ephemeral private key 434 to produce a response value 445. In another example, PKE circuitry 416 may sign the challenge value 441 using ephemeral private key 134 to produce a response value 445.

The response value is transmitted (612). For example, prover integrated circuit 410 may transmit response value 445 to verifier integrated circuit 420. Verifier integrated circuit 420 may verify response value 445 using ephemeral public key 435 to determine whether prover integrated circuit 410 is authentic. If prover integrated circuit 410 fails authentication, prover integrated circuit 410 will not be authenticated to system 100 as being authentic.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, and/or system 1040000, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
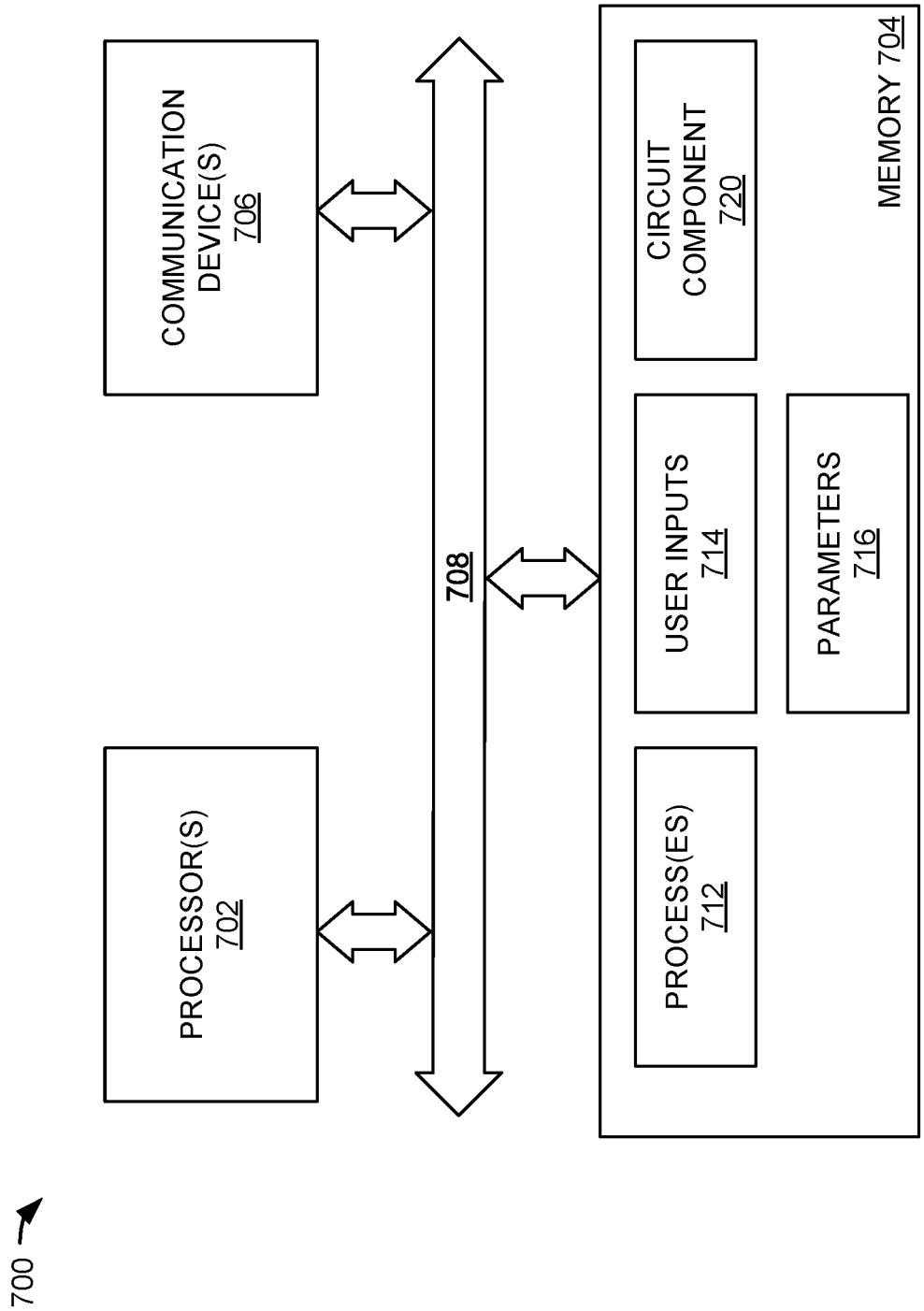
FIG. 7 is a block diagram of a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of system 100, system 400, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Implementations discussed herein include, but are not limited to, the following examples:

Example 1: An at-risk system component, comprising: an interface to communicate with a system when the replaceable system component is installed in the system, the interface to receive, via the system, a first challenge value; a first memory to provide a first keysplit value to an ephemeral key calculator; a proof-of-work function to, based on the first challenge value, provide a key multiplier value to the ephemeral key calculator; the ephemeral key calculator to, based on at least the first keysplit value and the key multiplier value, calculate an ephemeral key value; and, public key encryption circuitry to calculate, based at least on the ephemeral key value and a second challenge value, a response value to be communicated to the system via the interface.

Example 2: The at-risk system component of claim 1, further comprising: a physically unclonable function to provide a second keysplit value to the ephemeral key calculator, the ephemeral key calculator to calculate the ephemeral key value further based on the second keysplit value.

Example 3: The at-risk system component of claim 1, further comprising: a random number generator to provide a random mask value to the ephemeral key calculator.

Example 4: The at-risk system component of claim 3, wherein the ephemeral key calculator is to use the random mask value to obscure the key multiplier value from potential side channel analysis attacks.

Example 5: The at-risk system component of claim 1, wherein the first challenge value and the second challenge value are to be equal.

Example 6: The at-risk system component of claim 1, wherein the proof-of-work function is to, based on the first challenge value, provide the second challenge value to the public key encryption circuitry.

Example 7: The at-risk system component of claim 1, wherein the ephemeral key calculator uses elliptic curve cryptography to calculate the ephemeral key value.

Example 8: The at-risk system component of claim 1, wherein the system is configured to be a printing system and the replaceable system component is a cartridge to be installed in the printing system.

Example 9: A verifier integrated circuit, comprising: an interface to communicate with a system, and communicate with, via the system, a replaceable system component, the interface to communicate to the replaceable system component a first challenge value and to receive, from the replaceable system component a public key value and a response value; an ephemeral key calculator; a proof-of-work function to, based on the first challenge value, provide a key multiplier value to the ephemeral key calculator; the ephemeral key calculator to, based on at least the public key value and the key multiplier value, calculate an ephemeral public key value; and, public key encryption circuitry to determine, based at least on the ephemeral public key value, the response value, and a second challenge value, whether the replaceable system component is indicated to be authentic.

Example 10. The verifier integrated circuit of claim 9, wherein the first challenge value and the second challenge value are to be equal.

Example 11: The verifier integrated circuit of claim 9, wherein the proof-of-work function is to, based on the first challenge value, provide the second challenge value to the public key encryption circuitry.

Example 12: The verifier integrated circuit of claim 9, wherein the ephemeral key calculator uses elliptic curve cryptography to calculate the ephemeral public key value.

Example 13: The verifier integrated circuit of claim 9, wherein the system is configured to be a printing system and the replaceable system component is a cartridge to be installed in the printing system.

Example 14: A challenge-response authentication system, comprising: a prover integrated circuit that includes first proof-of work circuitry and a memory storing a first private keysplit value; a verifier integrated circuit that includes second proof-of-work circuitry, the verifier integrated circuit to communicate with the prover integrated circuit; the prover integrated circuit to receive a first challenge value transmitted by the verifier integrated circuit; the prover integrated circuit to transform the first challenge value into a second challenge value using the first proof-of-work circuitry; the verifier integrated circuit to transform the first challenge value into the second challenge value using the second proof-of-work circuitry; the prover integrated circuit to calculate an ephemeral private key value based at least in part on the second challenge value and the first private keysplit value; the verifier integrated circuit to calculate an ephemeral public key based at least in part on the second challenge value and a public key transmitted by the prover integrated circuit; the prover integrated circuit encrypting the second challenge value to generate a response value; and, the verifier integrated circuit to determine an authenticity of the prover integrated circuit at least in part on a version of the response value that has been decrypted using the ephemeral public key.

Example 15: The challenge-response authentication system of claim 14, wherein the prover integrated circuit further includes a physically unclonable function to generate a second private key value.

Example 16: The challenge-response authentication system of claim 15, wherein the ephemeral private key value is to be further based on the second private key value.

Example 17: The challenge-response authentication system of claim 14, wherein the prover integrated circuit further generates a random mask value.

Example 18: The challenge-response authentication system of claim 17, wherein the random mask value is used by the prover integrated circuit to obscure calculation of the ephemeral private key value from potential side channel analysis attacks.

Example 19: The challenge-response authentication system of claim 14, wherein the first proof-of-work circuitry is to, based on the first challenge value, provide the second challenge value to public key encryption circuitry.

Example 20: The challenge-response authentication system of claim 14, wherein ephemeral private key value calculations are based at least in part on elliptic curve cryptography.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An at-risk system component, comprising:
   an interface to communicate with a system when the at-risk system component is installed in the system, the interface to receive, via the system, a first challenge value;
   a first memory to provide a first keysplit value to an ephemeral key calculator;
   a proof-of-work function to, based on the first challenge value, provide a key multiplier value to the ephemeral key calculator;
   the ephemeral key calculator to, based on at least the first keysplit value and the key multiplier value, calculate an ephemeral key value; and
   public key encryption circuitry to calculate, based at least on the ephemeral key value and a second challenge value, a response value to be communicated to the system via the interface.

2. The at-risk system component of claim 1, further comprising:
   a physically unclonable function to provide a second keysplit value to the ephemeral key calculator, the ephemeral key calculator to calculate the ephemeral key value further based on the second keysplit value.

3. The at-risk system component of claim 1, further comprising:
   a random number generator to provide a random mask value to the ephemeral key calculator.

4. The at-risk system component of claim 3, wherein the ephemeral key calculator is to use the random mask value to obscure the key multiplier value from potential side channel analysis attacks.

5. The at-risk system component of claim 1, wherein the first challenge value and the second challenge value are to be equal.

6. The at-risk system component of claim 1, wherein the proof-of-work function is to, based on the first challenge value, provide the second challenge value to the public key encryption circuitry.

7. The at-risk system component of claim 1, wherein the ephemeral key calculator uses elliptic curve cryptography to calculate the ephemeral key value.

8. The at-risk system component of claim 1, wherein the system is configured to be a printing system and the replaceable system component is a cartridge to be installed in the printing system.

9. A verifier integrated circuit, comprising:
   an interface to communicate with a system, and communicate with, via the system, a replaceable system component, the interface to communicate to the replaceable system component a first challenge value and to receive, from the replaceable system component a public key value and a response value;
   an ephemeral key calculator;
   a proof-of-work function to, based on the first challenge value, provide a key multiplier value to the ephemeral key calculator;
   the ephemeral key calculator to, based on at least the public key value and the key multiplier value, calculate an ephemeral public key value; and
   public key encryption circuitry to determine, based at least on the ephemeral public key value, the response value, and a second challenge value, whether the replaceable system component is indicated to be authentic.

10. The verifier integrated circuit of claim 9, wherein the first challenge value and the second challenge value are to be equal.

11. The verifier integrated circuit of claim 9, wherein the proof-of-work function is to, based on the first challenge value, provide the second challenge value to the public key encryption circuitry.

12. The verifier integrated circuit of claim 9, wherein the ephemeral key calculator uses elliptic curve cryptography to calculate the ephemeral public key value.

13. The verifier integrated circuit of claim 9, wherein the system is configured to be a printing system and the replaceable system component is a cartridge to be installed in the printing system.

14. A challenge-response authentication system, comprising:
- a prover integrated circuit that includes first proof-of-work circuitry and a memory storing a first private keysplit value;
- a verifier integrated circuit that includes second proof-of-work circuitry, the verifier integrated circuit to communicate with the prover integrated circuit;
- the prover integrated circuit to receive a first challenge value transmitted by the verifier integrated circuit;
- the prover integrated circuit to transform the first challenge value into a second challenge value using the first proof-of-work circuitry;
- the verifier integrated circuit to transform the first challenge value into the second challenge value using the second proof-of-work circuitry;
- the prover integrated circuit to calculate an ephemeral private key value based at least in part on the second challenge value and the first private keysplit value;
- the verifier integrated circuit to calculate an ephemeral public key based at least in part on the second challenge value and a public key transmitted by the prover integrated circuit;
- the prover integrated circuit encrypting the second challenge value to generate a response value; and
- the verifier integrated circuit to determine an authenticity of the prover integrated circuit at least in part on a version of the response value that has been decrypted using the ephemeral public key.

15. The challenge-response authentication system of claim 14, wherein the prover integrated circuit further includes a physically unclonable function to generate a second private key value.

16. The challenge-response authentication system of claim 15, wherein the ephemeral private key value is to be further based on the second private key value.

17. The challenge-response authentication system of claim 14, wherein the prover integrated circuit further generates a random mask value.

18. The challenge-response authentication system of claim 17, wherein the random mask value is used by the prover integrated circuit to obscure calculation of the ephemeral private key value from potential side channel analysis attacks.

19. The challenge-response authentication system of claim 14, wherein the first proof-of-work circuitry is to, based on the first challenge value, provide the second challenge value to public key encryption circuitry.

20. The challenge-response authentication system of claim 14, wherein ephemeral private key value calculations are based at least in part on elliptic curve cryptography.

* * * * *